(12) United States Patent
Ulupinar et al.

(10) Patent No.: US 8,902,805 B2
(45) Date of Patent: *Dec. 2, 2014

(54) CELL RELAY PACKET ROUTING

(75) Inventors: Fatih Ulupinar, San Diego, CA (US);
Gavin B. Horn, La Jolla, CA (US);
Parag A. Agashe, San Diego, CA (US);
Nathan E. Tenny, Poway, CA (US);
Yongsheng Shi, Falls Church, VA (US)

(73) Assignee: QUALCOMM Incorporated, San Diego, CA (US)

( * ) Notice: Subject to any disclaimer, the term of this patent is extended or adjusted under 35 U.S.C. 154(b) by 762 days.

This patent is subject to a terminal disclaimer.

(21) Appl. No.: 12/603,392

(22) Filed: Oct. 21, 2009

(65) Prior Publication Data

US 2010/0103861 A1 Apr. 29, 2010

Related U.S. Application Data

(60) Provisional application No. 61/108,287, filed on Oct. 24, 2008.

(51) Int. Cl.
*H04B 7/14* (2006.01)

(52) U.S. Cl.
USPC .......................................... 370/315; 370/338

(58) Field of Classification Search
USPC .......................................... 370/315, 338, 400
See application file for complete search history.

(56) References Cited

U.S. PATENT DOCUMENTS

| | | | |
|---|---|---|---|
| 5,999,980 | A | 12/1999 | Tanaka et al. |
| 6,839,339 | B1 | 1/2005 | Chuah |
| 7,301,947 | B2 | 11/2007 | Tourunen et al. |
| 7,616,601 | B2 | 11/2009 | Norrgard et al. |

(Continued)

FOREIGN PATENT DOCUMENTS

| | | |
|---|---|---|
| CN | 1470120 A | 1/2004 |
| CN | 201004703 Y | 1/2008 |

(Continued)

OTHER PUBLICATIONS

3GPP TS 36.331 (Sep. 2008) Technical Specification; 3rd Generation Partnership Project; Technical Specification Group Radio Access Network; Evolved Universal Terrestrial Radio Access (E-UTRA) Radio Resource Control (RRC); Protocol specification (Release 8), Sep. 1, 2008, pp. 33-34, XP002572886, paragraph 5.3.5, p. 34, lines 1-3, figure 5.3.5.1-1.

(Continued)

*Primary Examiner* — Phuc Tran
(74) *Attorney, Agent, or Firm* — Michael J. DeHaemer, Jr.

(57) ABSTRACT

Systems and methodologies are described that facilitate packet routing among relay eNBs in a wireless network. A donor eNB can create at least a portion of a tunnel endpoint identifier (TEID) for a relay eNB communicating with a UE or other device. In addition, the relay eNB communicating with the UE can create a portion of the TEID. Upon receiving packets with a TEID, the donor eNB can route the packets to downstream eNBs based on the portion of the TEID that it created. Other downstream eNBs can continue to route packets to next hop eNBs based on the portion of the TEID created by the donor eNB or the downstream eNBs themselves. The relay eNB communicating with the UE can route packets to the UE based on the portion of the TEID it created and/or the portion created by the donor eNB.

42 Claims, 14 Drawing Sheets

(56) References Cited

U.S. PATENT DOCUMENTS

| | | | |
|---|---|---|---|
| 7,876,808 | B2 | 1/2011 | Catreux-Erceg et al. |
| 7,881,247 | B2 | 2/2011 | Pan et al. |
| 7,986,915 | B1 | 7/2011 | Wang et al. |
| 8,054,806 | B2 | 11/2011 | Aydin et al. |
| 8,055,263 | B2 | 11/2011 | Kwak et al. |
| 8,064,395 | B2 | 11/2011 | Gasparroni et al. |
| 8,064,909 | B2 | 11/2011 | Spinelli et al. |
| 2003/0223381 | A1 | 12/2003 | Schroderus |
| 2004/0001508 | A1 | 1/2004 | Zheng et al. |
| 2005/0265363 | A1* | 12/2005 | Chen ............................ 370/401 |
| 2006/0139869 | A1* | 6/2006 | Matusz ........................ 361/685 |
| 2006/0262732 | A1 | 11/2006 | Joutsenvirta et al. |
| 2007/0072604 | A1 | 3/2007 | Wang |
| 2007/0171871 | A1 | 7/2007 | Forsberg |
| 2007/0213060 | A1 | 9/2007 | Shaheen |
| 2007/0230352 | A1 | 10/2007 | Kokku et al. |
| 2008/0062904 | A1 | 3/2008 | Tzu-Ming |
| 2008/0064390 | A1 | 3/2008 | Kim |
| 2008/0070562 | A1 | 3/2008 | Cho et al. |
| 2008/0080399 | A1 | 4/2008 | Wang et al. |
| 2008/0123660 | A1 | 5/2008 | Sammour et al. |
| 2008/0144555 | A1 | 6/2008 | Hong et al. |
| 2008/0165719 | A1 | 7/2008 | Visotsky |
| 2008/0165776 | A1 | 7/2008 | Tao et al. |
| 2008/0181176 | A1 | 7/2008 | Lee et al. |
| 2008/0219203 | A1* | 9/2008 | Chou et al. .................... 370/315 |
| 2008/0240439 | A1 | 10/2008 | Mukherjee et al. |
| 2008/0268846 | A1 | 10/2008 | Shaheen |
| 2008/0268852 | A1 | 10/2008 | Petrovic et al. |
| 2009/0042576 | A1 | 2/2009 | Mukherjee et al. |
| 2009/0043902 | A1 | 2/2009 | Faccin |
| 2009/0052409 | A1 | 2/2009 | Chen et al. |
| 2009/0080422 | A1 | 3/2009 | Lee et al. |
| 2009/0109924 | A1 | 4/2009 | Sato |
| 2009/0111423 | A1 | 4/2009 | Somasundaram et al. |
| 2009/0111476 | A1 | 4/2009 | Hamalainen et al. |
| 2009/0196177 | A1 | 8/2009 | Teyeb et al. |
| 2009/0201878 | A1 | 8/2009 | Kotecha et al. |
| 2009/0215459 | A1 | 8/2009 | Kuo |
| 2009/0238207 | A1 | 9/2009 | Zhao et al. |
| 2009/0257432 | A1 | 10/2009 | Yamaguchi et al. |
| 2009/0296626 | A1 | 12/2009 | Hottinen et al. |
| 2010/0091823 | A1 | 4/2010 | Retana et al. |
| 2010/0097976 | A1 | 4/2010 | Agrawal et al. |
| 2010/0103845 | A1 | 4/2010 | Ulupinar et al. |
| 2010/0103857 | A1 | 4/2010 | Ulupinar et al. |
| 2010/0103862 | A1 | 4/2010 | Ulupinar et al. |
| 2010/0103863 | A1 | 4/2010 | Ulupinar et al. |
| 2010/0103864 | A1 | 4/2010 | Ulupinar et al. |
| 2010/0103865 | A1 | 4/2010 | Ulupinar et al. |
| 2010/0208645 | A1 | 8/2010 | Haemaelaeinen et al. |
| 2010/0226314 | A1 | 9/2010 | Xu |
| 2010/0238805 | A1 | 9/2010 | Ludwig et al. |
| 2010/0246533 | A1 | 9/2010 | Lundin et al. |
| 2010/0260098 | A1 | 10/2010 | Ulupinar et al. |
| 2010/0260126 | A1 | 10/2010 | Ulupinar et al. |
| 2010/0309881 | A1 | 12/2010 | Kim et al. |
| 2011/0044279 | A1 | 2/2011 | Johansson et al. |
| 2011/0222428 | A1 | 9/2011 | Charbit et al. |
| 2011/0235514 | A1 | 9/2011 | Huang et al. |
| 2012/0120831 | A1 | 5/2012 | Gonsa et al. |
| 2012/0140666 | A1 | 6/2012 | Takahashi et al. |
| 2012/0155375 | A1 | 6/2012 | Zhu |

FOREIGN PATENT DOCUMENTS

| | | |
|---|---|---|
| CN | 101138190 A | 3/2008 |
| CN | 101227714 A | 7/2008 |
| CN | 201134894 Y | 10/2008 |
| DE | 202007009672 | 11/2007 |
| EP | 0961516 A2 | 12/1999 |
| EP | 1122925 | 8/2001 |
| EP | 1362453 B1 | 11/2003 |
| EP | 1912390 A1 | 4/2008 |
| EP | 1921807 A1 | 5/2008 |
| EP | 2081332 A1 | 7/2009 |
| JP | 2001244993 | 9/2001 |
| JP | 2001292093 A | 10/2001 |
| JP | 2003519965 A | 6/2003 |
| JP | 2004509566 A | 3/2004 |
| JP | 2004511178 A | 4/2004 |
| JP | 2007506378 A | 3/2007 |
| JP | 2007143138 A | 6/2007 |
| JP | 2007531430 A | 11/2007 |
| JP | 2007318719 A | 12/2007 |
| JP | 2008104159 A | 5/2008 |
| JP | 2008172759 A | 7/2008 |
| JP | 2009535980 A | 10/2009 |
| JP | 2010518739 A | 5/2010 |
| KR | 20060009433 A | 2/2006 |
| KR | 20080048588 A | 6/2008 |
| TW | 419922 B | 1/2001 |
| TW | 490950 | 6/2002 |
| TW | 1273853 B | 2/2007 |
| TW | 200746863 | 12/2007 |
| TW | M329296 U | 3/2008 |
| TW | 200838192 | 9/2008 |
| WO | WO0225895 A1 | 3/2002 |
| WO | 0230043 A2 | 4/2002 |
| WO | WO2007019672 | 2/2007 |
| WO | 2007130281 A2 | 11/2007 |
| WO | 2008008145 A2 | 1/2008 |
| WO | WO2008072687 | 6/2008 |
| WO | 2008093472 A1 | 8/2008 |
| WO | WO-2008097147 A1 | 8/2008 |
| WO | WO2008125729 | 10/2008 |
| WO | WO2009080601 | 7/2009 |
| WO | WO2009134178 | 11/2009 |

OTHER PUBLICATIONS

3rd Generation Partnership Project; Technical Specification Group Radio Access Network; Evolved Universal Terrestrial Radio Access (E-UTRA); Relay architectures for E-UTRA (LTE-Advanced) (Release 9), 3GPP Draft; R2-095391 TR 36.806 V0.1.0 on Relay Architectures for E-UTRA, 3rd Generation Partnership Project (3GPP); France, No. Miyazki; 20091012, Sep. 1, 2009, XP050389991, paragraph 4, subparagraphs 4.2.1, 4.2.2, 4.2.3, subparagraphs 54.2.3.1, 4.2.3.2, figures 4.2.3.1-1 and 4.2.3.1-s, figures 4.2.3.2-1 and 4.2.3.2-2.

"A discussion on some technology components for LTE-Advanced" 3GPP Draft; R1-082024 (LTE-Advanced Technology Components), 3rd Generation Partnership Project (3GPP), Mobile Competence Centre; 650, Route Des Lucioles; F-06921 Sophia-Antipolis Cedex; France, vol. RAN WG1, No. Kansas City, USA; 20080514, May 14, 2008, XP050110365, the whole document.

Alcatel-Lucent Shanghai Bell et al: "Considerations on Type II Relay Related Issues," 3GPP Draft, R2-095853 Considerations on Type II Relay Related Issues, 3rd Generation Partnership Project, Mobile Competence Centre, October 16, 2009.

International Search Report—PCT/US2009/061947—International Search Authority, European Patent Office, Sep. 4, 2010.

International Search Report & Written Opinion—PCT/US09/061933, International Search Authority—European Patent Office—Feb. 4, 2010.

International Search Report & Written Opinion—PCT/US09/061934, International Search Authority—European Patent Office—Feb. 4, 2010.

International Search Report & Written Opinion—PCT/US09/061937, International Search Authority—European Patent Office—Feb. 4, 2010.

International Search Report & Written Opinion—PCT/US09/061939, International Search Authority—European Patent Office—Feb. 4, 2010.

International Search Report and Written Opinion—PCT/US2009/062100, International Search Authority—European Patent Office—Aug. 25, 2010.

International Search Report—PCT/US2009/061943—International Search Authority—European Patent Office, May 6, 2010.

(56) References Cited

OTHER PUBLICATIONS

"Mapping between EPS bearer and Radio Bearer" 3GPP Draft; R2-081902 Mapping Between EPS Bearer and Radio Bearer, 3rd Generation Partnership Project (3GPP), Mobile Competence Centre ; 650, Route Des Lucioles ; F-06921 Sophia-Antipolis Cedex; France, vol. RAN WG2, No. Shenzhen, China; 20080325, Mar. 25, 2008, XP050139586 the whole document.

Panasonic: "Discussion on the Various Types of Relays," 3GPP Draft, R1-082397, 3rd Generation Partnership Project, Mobile Competence Centre, Jun. 24, 2008.

RAN3 LTE-A Rapporteur: "LTE-A RAN3 Baseline Document" 3GPP Draft; R3-091447, 3rd Generation Partnership Project (3GPP), France, San Francisco, USA; May 9, 2009, XP050341769.

Rapporteur (Ericsson): "Updated TP to TR 36.806" 3GPP Draft; R3-092628, 3rd Generation Partnership Project (3GPP), France, No. Miyazaki; Oct. 12, 2009, XP050392105, paragraph 4, subparagraphs 4.2.2, 4.2.3, 4.2.4 and 4.2.4.2, figures 4.2.4.2-1 and 4.2.4.2-2.

"Universal Mobile Telecommunciations System (UMTS) Evolved Universal Terrestrial Radio Access (E-UTRA) and Evolved Universal Terrestrial Radio Access Network (E-UTRAN; Overall description; Stage 2 (3GPP TS 36.300 version 8.6.0 Release 8); ETSI TS 136 300" ETSI Standard, European Telecommunications Standards Institute (ETSI), Sophia Antipolis Cedex, France, vol. 3-R2, No. V8.6.0, Oct. 1, 2008, XP014042629, Paragraph 10.5.

"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.2.0 Release 8); ETSI TS 136 300" ETSI Standards, LIS, Sophia Antipolis Cedex, France, vol. 3-R2, No. V8.2.0, Oct. 1, 2007, XP014040285 ISSN: 0000-0001 the whole document.

Vodafone: "Transmission efficiencies and Security for the SI" 3GPP Draft; R3-071610, 3rd Generation Partnership Project (3GPP), Mobile Competence Centre ; 650, Route Des Lucioles ; F-06921 Sophia-Antipolis Cedex ; France, vol. RAN WG3, No. Athens, Greece; Aug. 17, 2007, XP050162419.

"3rd Generation Partnership Project; Technical Specification Group Core Network and Terminals; GPRS Tunnelling Protocol User Plane (GTPv1-U) (Release 8)", 3GPP TS 29.281 V1.1.0, 3GPP, Oct. 17, 2008, pp. 1-19.

Qualcomm Europe: "DRB establishment indication to NAS", 3GPP TSG-RAN WG2 meeting #63, R2-084066, 3GPP, Aug. 22, 2008.

Taiwan Search Report—TW098135990—TIPO—Mar. 9, 2013.

* cited by examiner

CELL RELAY PACKET ROUTING

CLAIM OF PRIORITY UNDER 35 U.S.C. §119

The present Application for Patent claims priority to Provisional Application No. 61/108,287 entitled "CELL RELAY BASE STATION FOR LTE" filed Oct. 24, 2008, and assigned to the assignee hereof and hereby expressly incorporated by reference herein.

BACKGROUND

1. Field

The following description relates generally to wireless communications, and more particularly to routing data packets among multiple access points.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. Access points, however, can be limited in geographic coverage area as well as resources such that mobile devices near edges of coverage and/or devices in areas of high traffic can experience degraded quality of communications from an access point.

Cell relays can be provided to expand network capacity and coverage area by facilitating communication between mobile devices and access points. For example, a cell relay can establish a backhaul link with a donor access point, which can provide access to a number of cell relays, and the cell relay can establish an access link with one or more mobile devices or additional cell relays. To mitigate modification to backend core network components, communication interfaces, such as S1-U, can terminate at the donor access point. Thus, the donor access point appears as a normal access point to backend network components. To this end, the donor access point can route packets from the backend network components to the cell relays for communicating to the mobile devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating routing packets between a donor eNB and one or more cell relay eNBs. In particular, a donor eNB can assign a tunnel endpoint identifier (TEID) to one or more relay eNBs (or related bearers), in a cluster of the donor eNB. In one example, the TEID can comprise a portion assigned by the donor eNB and a portion assigned by the corresponding relay eNB. In another example, the TEID can comprise an identifier for each hop between a donor eNB and/or relay eNB compressed into the single TEID. In yet another example, relay eNB can select a TEID and request approval from the donor eNB. Moreover, for example, a cell radio network temporary identifier (C-RNTI) of the relay eNB can be utilized as the TEID. In any case, the donor eNB can utilize the TEID to communicate packets from related relay eNBs to the core network such that response data can be received from the core network comprising the TEID. Based at least in part on the TEID, the donor eNB and related relay eNBs can appropriately route the downlink packets to appropriate relay eNBs.

According to related aspects, a method is provided that includes receiving a packet from a network node comprising a TEID that includes at least a portion generated by a donor eNB. The method also includes determining a disparate network node to receive the packet based at least in part on the TEID and transmitting the packet to the disparate network node.

Another aspect relates to a wireless communications apparatus. The wireless communications apparatus can include at least one processor configured to obtain a packet from a network node comprising a TEID having at least a portion assigned by a donor eNB and identify a disparate network node related to the TEID. The at least one processor is further configured to transmit the packet to the disparate network node. The wireless communications apparatus also comprises a memory coupled to the at least one processor.

Yet another aspect relates to an apparatus. The apparatus includes means for identifying a network node related to a TEID received in a packet from a disparate network node, wherein the TEID includes a portion generated by a donor eNB. The apparatus also includes means for transmitting the packet to the network node.

Still another aspect relates to a computer program product, which can have a computer-readable medium including code for causing at least one computer to receive a packet from a network node comprising a TEID that includes at least a portion generated by a donor eNB. The computer-readable medium can also comprise code for causing the at least one computer to determine a disparate network node to receive the packet based at least in part on the TEID and code for causing the at least one computer to transmit the packet to the disparate network node.

Moreover, an additional aspect relates to an apparatus including a routing table component that identifies a network node related to a TEID received in a packet from a disparate network node, wherein the TEID includes a portion generated by a donor eNB. The apparatus can further include a packet routing component that transmits the packet to the network node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
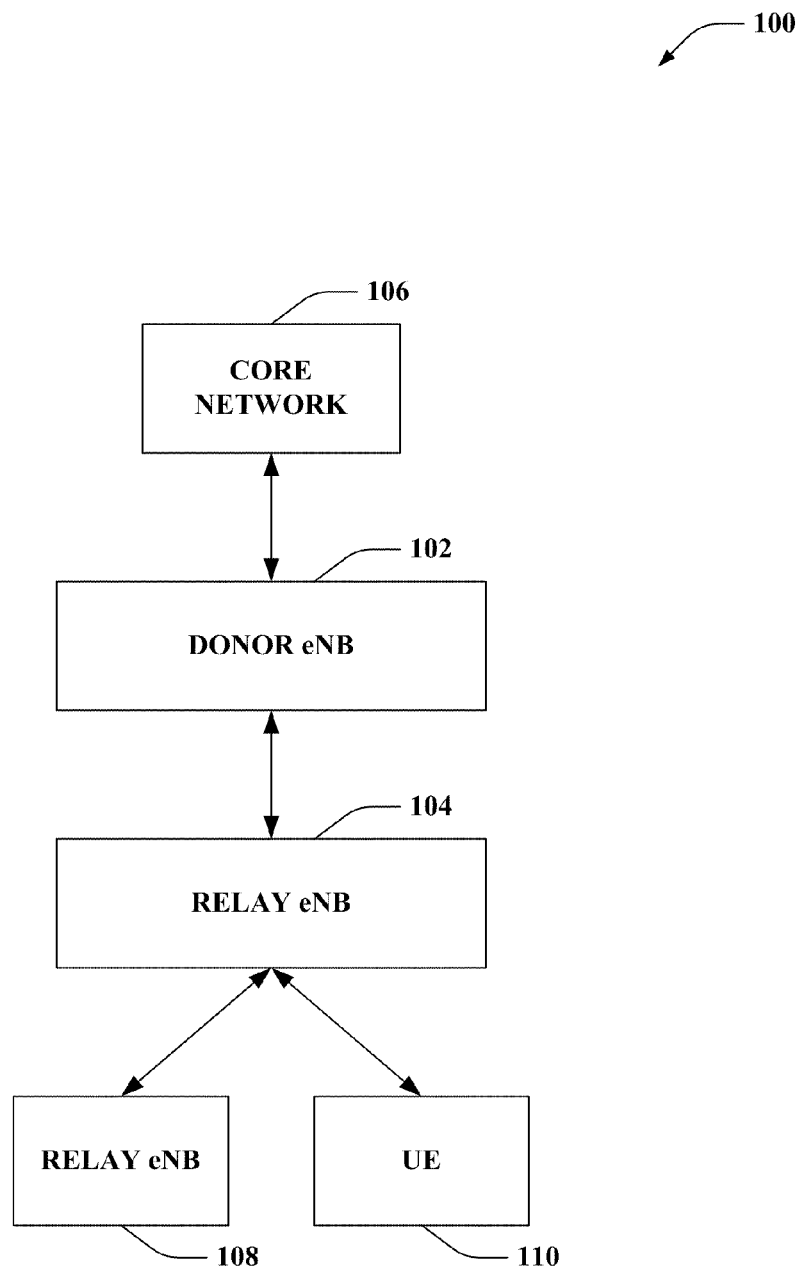
FIG. 1 is an illustration of an example wireless communications system that facilitates providing relays for wireless networks.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates providing relay functionality in wireless networks. System 100 includes a donor eNB 102 that provides one or more relay eNBs, such as relay eNB 104, with access to a core network 106. Similarly, relay eNB 104 can provide one or more disparate relay eNBs, such as relay eNB 108, or UEs, such as UE 110, with access to the core network 106 via donor eNB 102. Donor eNB 102, which can also be referred to as a cluster eNB, can communicate with the core network 106 over a wired or wireless backhaul link, which can be an LTE or other technology backhaul link. In one example, the core network 106 can be a 3GPP LTE or similar technology network.

Donor eNB 102 can additionally provide an access link for relay eNB 104, which can also be wired or wireless, LTE or other technologies, and the relay eNB 104 can communicate with the donor eNB 102 using a backhaul link over the access link of the donor eNB 102. Relay eNB 104 can similarly provide an access link for relay eNB 108 and/or UE 110, which can be a wired or wireless LTE or other technology link. In one example, donor eNB 102 can provide an LTE access link, to which relay eNB 104 can connect using an LTE backhaul, and relay eNB 104 can provide an LTE access link to relay eNB 108 and/or UE 110. Donor eNB 102 can connect to the core network 106 over a disparate backhaul link technology. Relay eNB 108 and/or UE 110 can connect to the relay eNB 104 using the LTE access link to receive access to core network 106, as described. A donor eNB and connected relay eNBs can be collectively referred to herein as a cluster.

According to an example, relay eNB 104 can connect to a donor eNB 102 at the link layer (e.g., media access control (MAC) layer) as would a UE in regular LTE configurations. In this regard, donor eNB 102 can be a regular LTE eNB requiring no changes at the link layer or related interface (e.g., E-UTRA-Uu) to support the relay eNB 104. In addition, relay eNB 104 can appear to UE 110 as a regular eNB at the link layer, such that no changes are required for UE 110 to connect to relay eNB 104 at the link layer, for example. In addition, relay eNB 104 can configure procedures for resource partitioning between access and backhaul link, interference management, idle mode cell selection for a cluster, and/or the like.

With respect to transport layer communications, transport protocols related to relay eNB 108 or UE 110 communications can terminate at the donor eNB 102, referred to as cell relay functionality, since the relay eNB 104 is like a cell of the donor eNB 102. For example, in a cell relay configuration, donor eNB 102 can receive communications for the relay eNB 104 from the core network 106, terminate the transport protocol, and forward the communications to the relay eNB 104 over a disparate transport layer keeping the application layer substantially intact. It is to be appreciated that the forwarding transport protocol type can be the same as the terminated transport protocol type, but is a different transport layer established with the relay eNB 104.

Relay eNB 104 can determine a relay eNB or UE related to the communications, and provide the communications to the relay eNB or UE, based on an identifier thereof within the communications). Similarly, donor eNB 102 can terminate the transport layer protocol for communications received from relay eNB 104, translate the communications to a disparate transport protocol, and transmit the communications over the disparate transport protocol to the core network 106 with the application layer intact for relay eNB 104 as a cell relay. In these examples, where relay eNB 104 is communicating with another relay eNB, the relay eNB 104 can support application protocol routing to ensure communications reach the correct relay eNB.

Moreover, application layer protocols can terminate at upstream eNBs. Thus, for example, application layer protocols for relay eNB 108 and UE 110 can terminate at relay eNB 104, and similarly for relay eNB 104 can terminate at donor eNB 102. The transport and application layer protocols, for example, can relate to S1-U, S1-MME, and/or X2 interfaces. S1-U interface can be utilized to communicate in a data plane between a node and a serving gateway (not shown) of the core network 106. S1-MME interface can be utilized for control plane communications between a node and a mobility management entity (MME) (not shown) of the core network 106. X2 interface can be utilized for communications between eNBs. In addition, for example, donor eNB 102 can communicate with other relay eNBs to allow communications therebetween over the access network (e.g., relay eNB 104 can communicate with one or more additional relay eNBs connected to donor eNB 102).

To facilitate routing packets, donor eNB 102 can assign a tunnel endpoint identifier (TEID) to one or more relay eNBs in the cluster (e.g., relay eNB 104 and 108). Upon receiving requests or other information from the relay eNBs, donor eNB 102 can associate the TEID to the requests or other information before transmitting to the core network 106. Core network 106 can process the requests or other information and include the TEID in any response or other related data. Donor eNB 102 can determine a destination (or at least an immediate relay eNB for the data) based on the TEID.

In one example, a TEID for relay eNB 108 can include a prefix portion assigned by the donor eNB 102 and a suffix portion assigned by the relay eNB 108 (or vice versa). Indeed, substantially any algorithmic combination of a portion generated by the donor eNB 102 and a portion generated by the relay eNB 108 can be utilized. For example, the suffix can relate to the one or more UEs to facilitate routing thereto. Donor eNB 102 can associate a prefix, unique to the donor eNB 102, to the relay eNB 108, and associate the prefix with a cell radio network temporary identifier (C-RNTI) or other identifier of relay eNB 104, which is the next downstream relay eNB from donor eNB 102 in a communication path to relay eNB 108. In this example, where packets relating to relay eNB 108 are received from the core network 106, donor eNB 102 can obtain the prefix of a TEID in the packets, determine the next downstream relay eNB based on the prefix (e.g., by locating the prefix and a matching C-RNTI of the relay eNB 104 in a routing table), and transmit the packets (or new packets with a disparate transport layer), along with the TEID, to the relay eNB 104. Relay eNB 104 can receive the packets and TEID and determine that the packets relate to relay eNB 108 based on the prefix (e.g., relay eNB 104 can have associated the prefix with the C-RNTI of relay eNB 108 by receiving the TEID prefix from the donor eNB 102), and route the packets to relay eNB 108. Relay eNB 108 can forward the packets to a related UE or other device based on the suffix (e.g., relay eNB 108 can maintain a routing table associating the suffix to a UE and/or related radio bearers).

In another example, eNBs in a cluster can each assign a prefix in a portion of the TEID. Thus, using the previous example, relay eNB 104 and donor eNB 102 can assign a portion of the prefix for the TEID for relay eNB 108, and relay eNB 108 can generate the suffix. In this regard, upon receiving packets with the TEID, donor eNB 102 can extract its portion of the prefix, associate the packets with relay eNB 104 (e.g., via a routing table, as described above), and transmit the packets to relay eNB 104. Similarly, relay eNB 104 can extract its portion of the TEID, associate the packets with relay eNB 108 (e.g., via a routing table, as described above), and transmit the packets to relay eNB 108. Relay eNB 108 can forward the packets to a UE or other device based on the suffix, as described.

In yet another example, donor eNB 102 can assign a TEID for each relay eNB, such as relay eNB 108. In this example, donor eNB 102 and relay eNB 104 both store the TEID along with the C-RNTI of the next downstream relay eNB, as described. Relay eNB 108 can store the TEID and related UE/bearer information. Similarly, in an example, relay eNB 108 can request assignment of a TEID, and donor eNB 102 can accept or reject the request. In one example, donor eNB 102, where it rejects the TEID (e.g., because it is in use or invalid), can provide a useable TEID in the rejection. In either case, for example, similar routing can be utilized as where the donor eNB 102 assigns the TEID.

Figure 2:
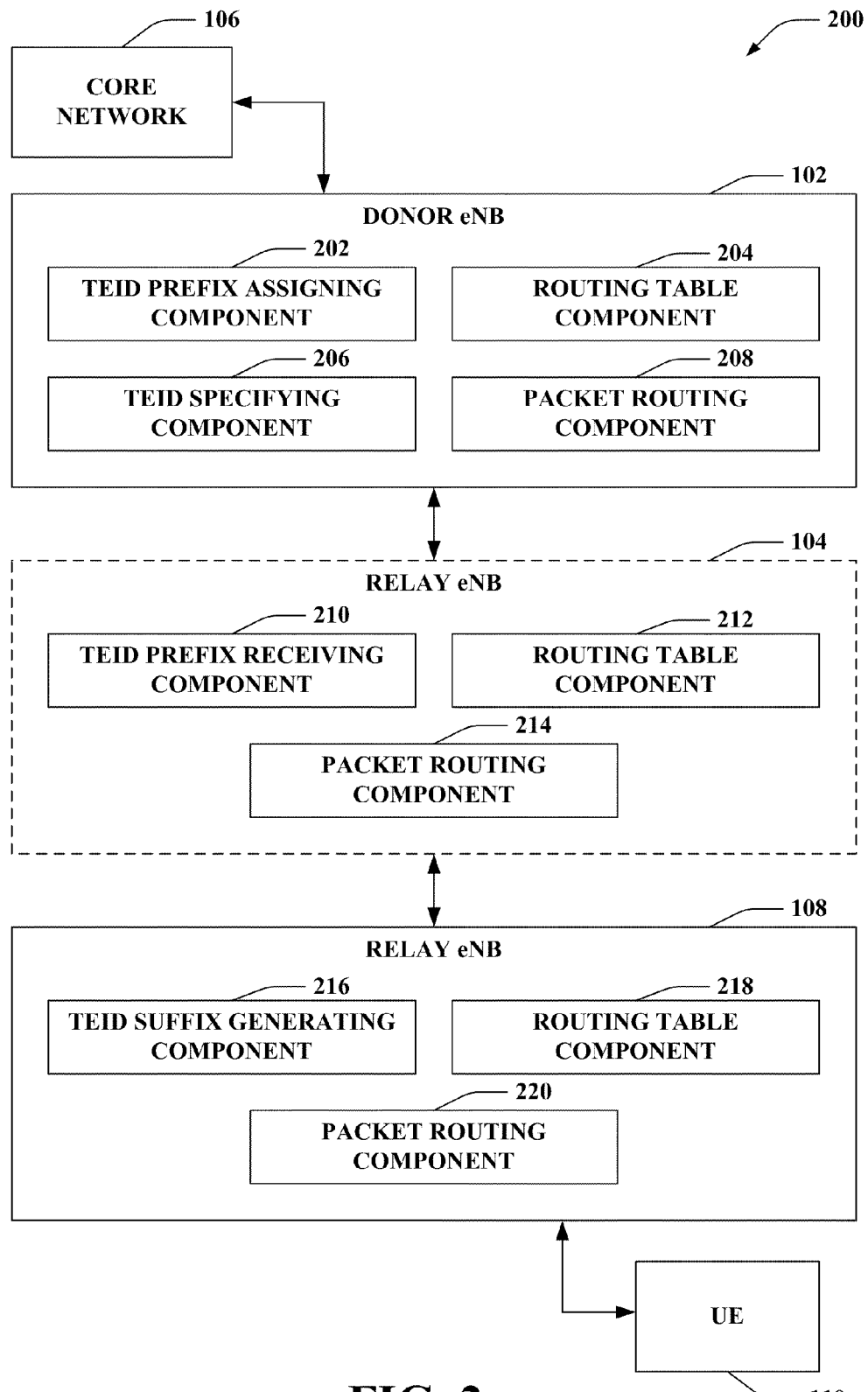
FIG. 2 is an illustration of an example wireless communications system that facilitates generating tunnel endpoint identifiers (TEID) comprising a prefix and suffix.

Turning now to FIG. 2, an example wireless communication system 200 that facilitates generating a TEID for a relay eNB having a donor eNB specific prefix and relay eNB specific suffix is illustrated. System 200 includes a donor eNB 102 that provides relay eNB 104 (and/or other relay eNBs) with access to core network 106. Additionally, as described, relay eNB 104 can provide relay eNB 108 with access to the core network 106 through the donor eNB 102. In an example, however, relay eNB 104 may not be present, and relay eNB 108 can communicate directly with donor eNB 102. In a similar example, there can be multiple relay eNBs 104 between the donor eNB 102 and relay eNB 108. In addition, it is to be appreciated that relay eNB 108 can comprise the components of relay eNB 104 and provide similar functionality, in one example. Moreover, donor eNB 102 can be a macrocell access point, femtocell access point, picocell access point, mobile base station, and/or the like. Relay eNBs 104 (and relay eNB 108) can similarly be mobile or stationary relay nodes that communicate with donor eNB 102 (and relay eNB 104) over a wireless or wired backhaul, as described.

Donor eNB 102 comprises a TEID prefix assigning component 202 that selects a prefix unique to the relay eNB at the donor eNB 102 level, a routing table component 204 that maintains a routing table associating TEID prefixes to identifiers (e.g., C-RNTI) of related downstream relay eNBs, a TEID specifying component 206 that provides the TEID or prefix to the related relay eNB, and a packet routing component 208 that routes packets received from the core network 106 based on a TEID specified in the packets.

Relay eNB 104 can include a TEID prefix receiving component 210 that obtains an assigned TEID prefix from the upstream relay eNB or donor eNB for the downstream eNB, a routing table component 212 that stores associations between TEIDs and identifiers (e.g., C-RNTI) of related downstream relay eNBs, and a packet routing component 214 that forwards packets from an upstream eNB to the downstream relay eNB based at least in part on a TEID specified in the packets.

Relay eNB 108 comprises a TEID suffix generating component 216 that creates a TEID suffix for a UE 110 or related bearer communicating with relay eNB 108, a routing table component 218 that associates the TEID suffix to an identifier (e.g., C-RNTI) of the related UE 110 or bearer thereof, and a packet routing component 220 that communicates packets received from upstream eNBs to the UE 110 based at least in part on a TEID specified in the packets.

According to an example, relay eNB 108 can request access to core network 106 using relay eNB 104 (if present) to communicate with donor eNB 102. In one example, relay eNB 108 can formulate such a request based at least in part on the UE 110 (or other device) transmitting a request to relay eNB 108. In this case, TEID suffix generating component 216 create a TEID suffix related to the UE 110, and routing table component 218 can store an association between the suffix and an identifier for the UE 110 or related bearer (e.g., a C-RNTI and/or the like). In one example, the routing table can be similar to the following format.

| TEID Suffix | UE Identifier (C-RNTI) | Radio Bearer ID |
|---|---|---|
| bb | xx | Mm |
| ... | ... | ... |

Upon donor eNB 102 receiving a request for network access from relay eNB 108 (e.g., through relay eNB 104 where present), TEID prefix assigning component 202 can allocate a TEID prefix, unique to the donor eNB 102, for the relay eNB 108 or related bearer. Routing table component 204 can store the generated TEID prefix as associated with an identifier or C-RNTI related to the next downstream relay eNB, which is relay eNB 104 if present, or relay eNB 108 if relay eNB 104 is not present. In one example, the routing table can be similar to the following format.

| TEID Prefix | Next Downstream Relay eNB ID (C-RNTI) |
|---|---|
| aa | xx |
| ... | ... |

TEID specifying component 206 can subsequently provide the TEID prefix to its downstream eNB. For example, where relay eNB 104 is present, TEID prefix receiving component 210 can obtain the TEID prefix, and routing table component 212 can associate the TEID prefix with an identifier or C-RNTI for its next downstream eNB to get to relay eNB 108, which is relay eNB 108 in the depicted example. It is to be appreciated that where additional relay eNBs are present, their respective routing table components can associate the TEID prefix with the next downstream relay eNB. In any case, TEID prefix receiving component 210 can provide the TEID prefix to the next downstream relay eNB (relay eNB 108 in this example).

In an example, donor eNB 102 can receive a packet from a core network 106 having a specified TEID, such as a response packet to the original request of UE 110. Packet routing component 208 can extract the TEID from the packet, and routing table component 204 can determine the related identifier for downstream relay eNB based on the TEID prefix. Accordingly, donor eNB 102 can forward the packet (or transmit the packet over a new transport layer, as described) to relay eNB 104 if present, or relay eNB 108 if relay eNB 104 is not present. Where relay eNB 104 is present, it can receive the packet. Packet routing component 214 can similarly extract the TEID from the packet, and routing table component 212 can determine the next downstream relay eNB based on the TEID prefix. In this example, it is relay eNB 108, but it is to be appreciated that additional layers of relay eNB can be between relay eNB 108 and donor eNB 102. Relay eNB 104 can forward the packet to relay eNB 108.

Whether relay eNB 108 receives the packet from relay eNB 104 or donor eNB 102 (where relay eNB 104 is not present), packet routing component 220 can extract the TEID from the packet. Routing table component 218 can match the TEID suffix to an identifier for UE 110 and/or a related radio bearer. Packet routing component 220 can accordingly provide the packet to UE 110. In this example, donor eNB 102 need not store individual bearer information since the relay eNB 108 associates the suffix to the bearer itself, and donor eNB 102 only needs to know which next downstream relay eNB receives packets from core network 106.

In another example, where relay eNB 104 is not present and relay eNBs connect on the uplink only to donor eNBs, no independent TEID assignment request is needed. In this example, TEID prefix assigning component 202 can utilize the relay eNB 108 C-RNTI as the TEID prefix. Thus, when packets are received from core network 106, packet routing component 208 can forward the packet based on the C-RNTI and no routing table is necessary.

Figure 3:
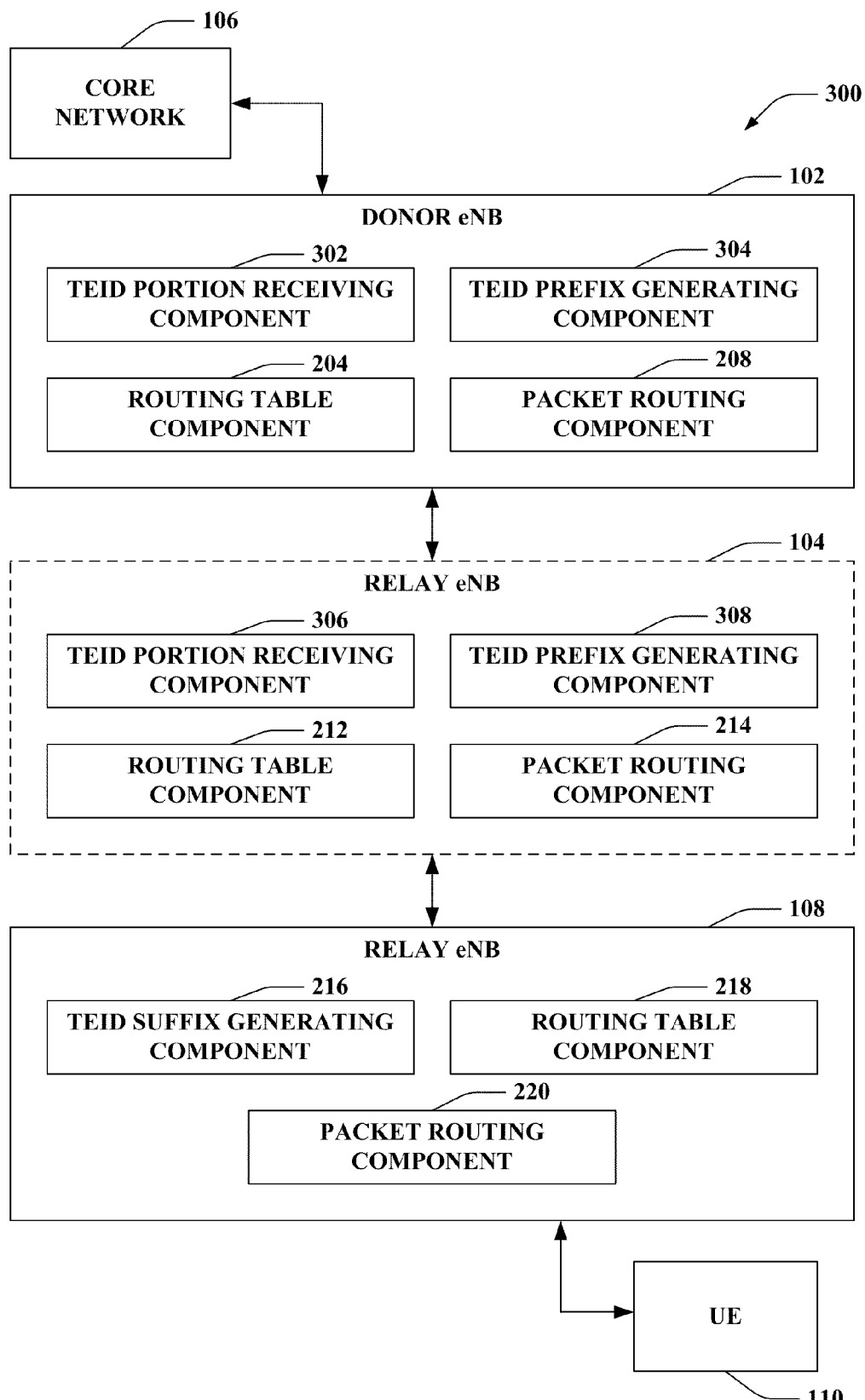
FIG. 3 is an illustration of an example wireless communications system that creates TEIDs for relay eNBs comprising prefixes for one or more eNBs and a suffix.

Turning now to FIG. 3, an example wireless communication system 300 that facilitates generating a TEID for a relay eNB having a portion from one or more donor or upstream relay eNBs and relay eNB specific portion is illustrated. System 300 includes a donor eNB 102 that provides relay eNB 104 (and/or other relay eNBs) with access to core network 106. Additionally, as described, relay eNB 104 can provide relay eNB 108 with access to the core network 106 through the donor eNB 102. In an example, however, relay eNB 104 may not be present, and relay eNB 108 can communicate directly with donor eNB 102. In a similar example, there can be multiple relay eNBs 104 between the donor eNB 102 and relay eNB 108. In addition, it is to be appreciated that relay eNB 108 can comprise the components of relay eNB 104 and provide similar functionality, in one example. Moreover, donor eNB 102 can be a macrocell access point, femtocell access point, picocell access point, mobile base station, and/or the like. Relay eNBs 104 (and relay eNB 108) can similarly be mobile or stationary relay nodes that communicate with donor eNB 102 (and relay eNB 104) over a wireless or wired backhaul, as described.

Donor eNB 102 comprises a TEID portion receiving component 302 that obtains a TEID portion related to one or more downstream relay eNBs, a TEID prefix generating component 304 that creates a TEID prefix unique to the donor eNB 102 and applies the TEID prefix to the TEID portion, a routing table component 204 that maintains a routing table associating TEID prefixes to identifiers (e.g., C-RNTI) of related downstream relay eNBs, and a packet routing component 208 that routes packets received from the core network 106 based on a TEID specified in the packets.

Relay eNB 104 can include a TEID portion receiving component 306 that obtains a TEID portion related to one or more downstream relay eNBs and provides the TEID portion to an upstream relay eNB or donor eNB, a TEID prefix generating component 308 that creates a TEID prefix unique to the relay eNB 104 and applies the TEID prefix to the TEID portion, a routing table component 212 that stores associations between TEID prefixes and identifiers (e.g., C-RNTI) of related downstream relay eNBs, and a packet routing component 214 that forwards packets from an upstream eNB to the downstream relay eNB based at least in part on a TEID specified in the packets.

Relay eNB 108 comprises a TEID suffix generating component 216 that creates a TEID suffix for a UE 110 or related bearer communicating with relay eNB 108, a routing table component 218 that associates the TEID suffix to an identifier (e.g., C-RNTI) of the related UE 110 or bearer thereof, and a packet routing component 220 that communicates packets received from upstream eNBs to the UE 110 based at least in part on a TEID specified in the packets.

According to an example, relay eNB 108 can request access to core network 106 using relay eNB 104 (if present) to communicate with donor eNB 102. In one example, relay eNB 108 can formulate such a request based at least in part on the UE 110 (or other device) transmitting a request to relay eNB 108. In this case, TEID suffix generating component 216 can create a TEID suffix related to the UE 110, and routing table component 218 can store an association between the suffix and an identifier for the UE 110 or related bearer (e.g., a C-RNTI and/or the like), as described previously. Upon donor eNB 102 receiving a network access request from relay eNB 108 (e.g., through relay eNB 104 where present), TEID prefix generating component 308 can create a TEID prefix portion unique at the relay eNB 104 to identify relay eNB 108. TEID prefix generating component 308 can transmit the TEID prefix portion to donor eNB 102. It is to be appreciated that where additional relay eNBs exist between the relay eNB 108 and donor eNB 102, the additional relay eNBs can receive the TEID prefix portion, generate a prefix unique at the relay eNB, apply the prefix to the portion, and forward the TEID portion to the next upstream relay or donor eNB.

TEID prefix generating component 304 can create a disparate TEID prefix portion unique at the donor eNB 102 and apply the disparate prefix portion to the TEID. In one example, the following algorithm can be utilized to generate each prefix portion for the relay and donor eNBs.

Assuming that there are maximum m immediate downstream relay eNBs under each donor eNB and there are maximum n simultaneously bearers under each relay or donor eNB, N bits are needed for bearers and M bits for relay eNBs:

$$N = \lceil \log_2 n \rceil$$

$$M = \lceil \log_2 (m+1) \rceil$$

Assuming that there are h hops (h hops means there are h−1 tiers of relay eNBs), (h−1)M bits are needed for all relay eNBs in the cluster. Thus the maximum number of hops that can be supported is:

$$N + (h-1)M = 32$$

$$\Rightarrow h = \left\lfloor \frac{32 - N + M}{M} \right\rfloor$$

Using the above algorithm, the prefix is cluster unique and the suffix is assigned by the relay eNB, which is unique for the relay eNB. The donor eNB and upstream relay eNBs do not need to maintain the state of TEID portions created by other eNBs. In one example, the TEID can have the following structure.

$$M = \lceil \log_2(m+1) \rceil \mid \ldots \mid M = \lceil \log_2(m+1) \rceil \mid N = \lceil \log_2 n \rceil$$

where the $M=\lceil \log_2(m+1) \rceil$ prefixes each relate to the h−1 relay eNBs and $N=\lceil \log_2 n \rceil$ is the suffix of the last relay eNB. In this regard, to route downlink packets, the donor eNB and intermediate relay eNBs can consult the certain part of TEID to obtain their prefix, and determine the next hop relay eNB identifier (e.g., C-RNTI). The last relay eNB consults the suffix to find the related UE to route packets, as described previously in other examples.

Thus, for example, relay eNB 108 can specify the TEID (e.g., the prefix comprised of portions generated by upstream relay eNBs and donor eNB 102 along with a suffix generated by TEID suffix generating component 216) in a network request related to a UE 110. Donor eNB 102 can provide the TEID to core network 106 when communicating on behalf of the relay eNB 108. In an example, donor eNB 102 can receive a packet from a core network 106 having a specified TEID, such as a response packet to the original request of UE 110. Packet routing component 208 can extract the TEID from the packet, and routing table component 204 can determine the related identifier for downstream relay eNB based on extracting donor eNBs 102 TEID prefix from the TEID, which can be the initial prefix, in the example depicted above. Accordingly, donor eNB 102 can forward the packet (or transmit the packet over a new transport layer, as described) to relay eNB 104 if present, or relay eNB 108 if relay eNB 104 is not present. Where relay eNB 104 is present, it can receive the packet. Packet routing component 214 can similarly extract the TEID prefix related to relay eNB 104 from the TEID in the packet, and routing table component 212 can determine the next downstream relay eNB based on the TEID prefix. In this example, it is relay eNB 108, and relay eNB 104 can forward the packet to relay eNB 108; however, it is to be appreciated that additional layers of relay eNB can be between relay eNB 108 and donor eNB 102, in which case relay eNB 104 can forward the packet to a disparate relay eNB.

Whether relay eNB 108 receives the packet from relay eNB 104 or donor eNB 102 (where relay eNB 104 is not present), packet routing component 220 can extract the TEID from the packet. Routing table component 218 can match the TEID suffix to an identifier for UE 110 and/or a related radio bearer. Packet routing component 220 can accordingly provide the packet to UE 110. In this example, donor eNB 102 and other upstream relay eNBs need not store TEID information beyond the TEID prefix portion generated at the donor eNB 102 or other upstream relay eNB.

Figure 4:
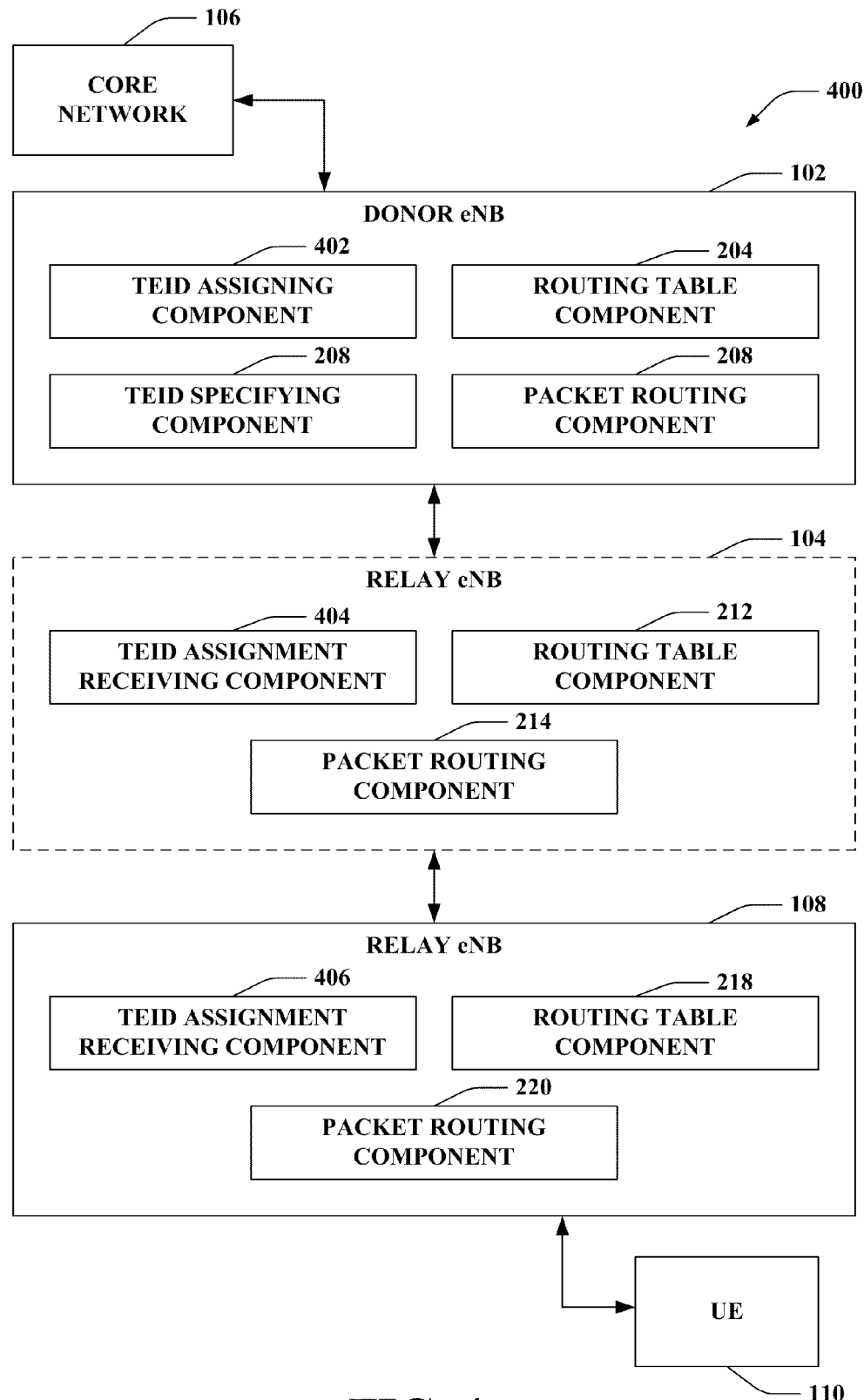
FIG. 4 is an illustration of an example wireless communications system that facilitates assigning TEIDs to relay eNBs.

Turning now to FIG. 4, an example wireless communication system 400 that facilitates assigning a TEID to one or more relay eNBs is illustrated. System 400 includes a donor eNB 102 that provides relay eNB 104 (and/or other relay eNBs) with access to core network 106. Additionally, as described, relay eNB 104 can provide relay eNB 108 with access to the core network 106 through the donor eNB 102. In an example, however, relay eNB 104 may not be present, and relay eNB 108 can communicate directly with donor eNB 102. In a similar example, there can be multiple relay eNBs 104 between the donor eNB 102 and relay eNB 108. In addition, it is to be appreciated that relay eNB 108 can comprise the components of relay eNB 104 and provide similar functionality, in one example. Moreover, donor eNB 102 can be a macrocell access point, femtocell access point, picocell access point, mobile base station, and/or the like. Relay eNBs 104 (and relay eNB 108) can similarly be mobile or stationary relay nodes that communicate with donor eNB 102 (and relay eNB 104) over a wireless or wired backhaul, as described.

Donor eNB 102 comprises a TEID assigning component 402 that allocates a TEID to one or more relay eNBs or related bearers, a routing table component 204 that maintains a routing table associating TEIDs to identifiers (e.g., C-RNTI) of related next level downstream relay eNBs, a TEID specifying component 206 that provides the TEID to the related relay eNB, and a packet routing component 208 that routes packets received from the core network 106 based on a TEID specified in the packets.

Relay eNB 104 can include a TEID assignment receiving component 404 that obtains an assigned TEID from the upstream relay eNB or donor eNB for the downstream eNB or related bearers requesting access to the core network 106, a routing table component 212 that stores associations between TEIDs and identifiers (e.g., C-RNTI) of related next level downstream relay eNBs, and a packet routing component 214 that forwards packets from an upstream eNB to the next level downstream relay eNB based at least in part on a TEID specified in the packets.

Relay eNB 108 comprises a TEID assignment receiving component 406 that obtains a TEID related to one or more bearers (e.g., of a UE 110), a routing table component 218 that associates the TEID to an identifier (e.g., C-RNTI) of the related UE 110 or bearer thereof, and a packet routing component 220 that communicates packets received from upstream eNBs to the UE 110 based at least in part on a TEID specified in the packets.

According to an example, relay eNB 108 can request access to core network 106 using relay eNB 104 (if present) to communicate with donor eNB 102. In one example, relay eNB 108 can formulate such a request based at least in part on the UE 110 (or other device) transmitting a request to relay eNB 108. Upon donor eNB 102 receiving an access request from relay eNB 108, TEID assigning component 402 can generate and/or otherwise assign a TEID to relay eNB 108 or a related bearer. In one example, the access request can be a bearer setup request. Routing table component 204 can associate the TEID to an identifier of the next downstream relay eNB, which can be relay eNB 104 if present. If not present, the next downstream relay eNB can be relay eNB 108. TEID specifying component 206 can provide the TEID to the next downstream relay eNB.

Where relay eNB 104 is present, for example, TEID assignment receiving component 404 can obtain the TEID. Routing table component 212 can store the TEID along with an association to the next downstream relay eNB (e.g., relay eNB 108 in this example). TEID assignment receiving component 404 can additionally forward the TEID to the next downstream relay eNB, which is relay eNB 108 in this example. TEID assignment receiving component 406 can obtain the TEID, and routing table component 218 can store the TEID with an identifier for UE 110 and/or a bearer thereof. Subsequently, when donor eNB 102 receives requests from relay eNB 108 (e.g., via relay eNB 104 and/or one or more additional eNBs) for core network 106, it can specify the TEID in the requests.

In an example, donor eNB 102 can receive a packet from a core network 106 having a specified TEID, such as a response packet to the original request of UE 110. Packet routing component 208 can extract the TEID from the packet, and routing table component 204 can determine the related identifier for downstream relay eNB based on the TEID. Accordingly, donor eNB 102 can forward the packet (or transmit the packet over a new transport layer, as described) to relay eNB 104 if present, or relay eNB 108 if relay eNB 104 is not present. Where relay eNB 104 is present, it can receive the packet. Packet routing component 214 can similarly extract the TEID from the packet, and routing table component 212 can determine the next downstream relay eNB based on the TEID. In this example, it is relay eNB 108, but it is to be appreciated that additional layers of relay eNB can be between relay eNB 108 and donor eNB 102. Relay eNB 104 can forward the packet to relay eNB 108. Whether relay eNB 108 receives the packet from relay eNB 104 or donor eNB 102 (where relay eNB 104 is not present), packet routing component 220 can extract the TEID from the packet. Routing table component 218 can match the TEID to an identifier for UE 110 and/or a related radio bearer. Packet routing component 220 can accordingly provide the packet to UE 110.

Figure 5:
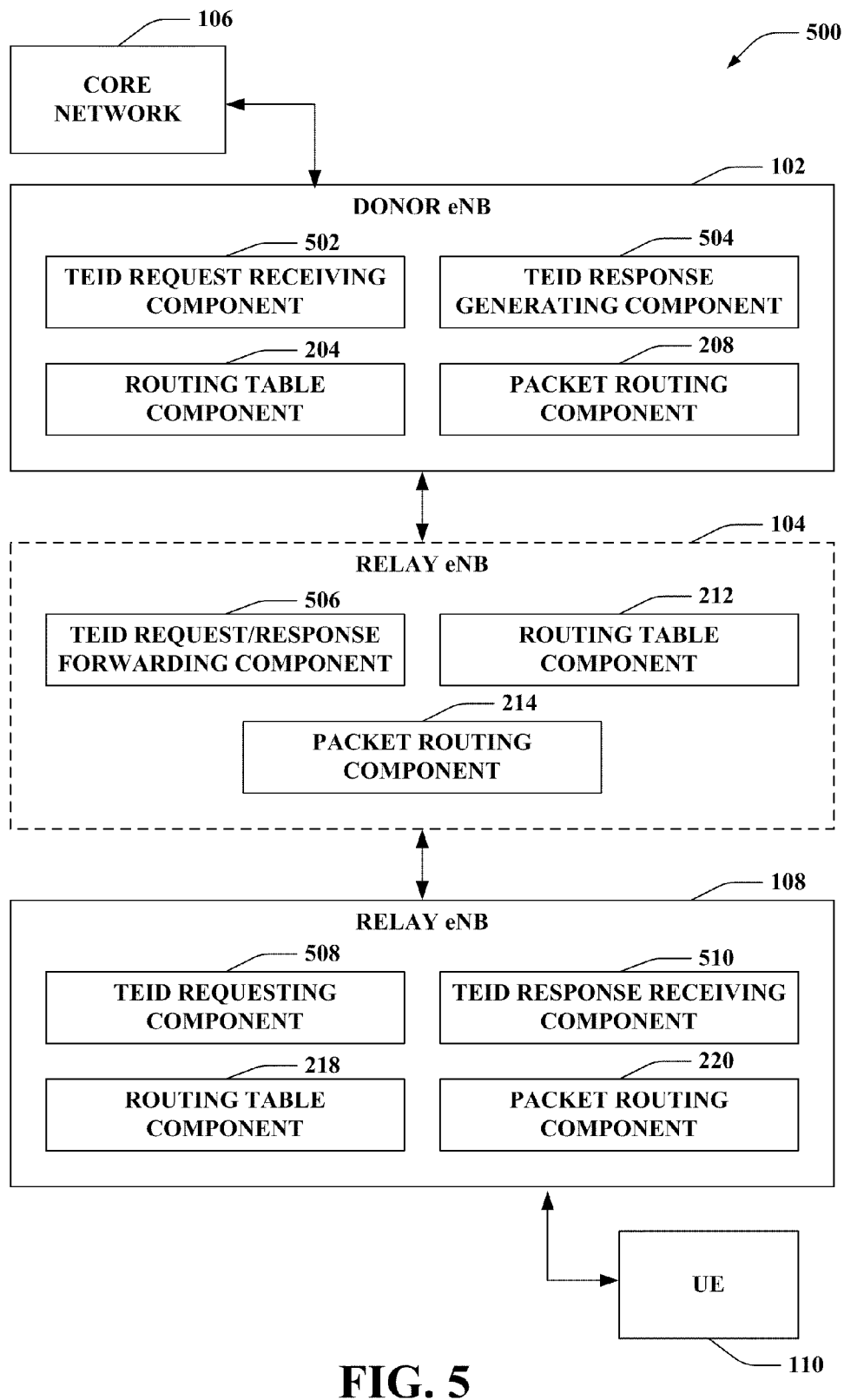
FIG. 5 is an illustration of an example wireless communications system that facilitates requesting TEID assignment.

Turning now to FIG. 5, an example wireless communication system 500 that facilitates assigning a TEID to one or more relay eNBs is illustrated. System 500 includes a donor eNB 102 that provides relay eNB 104 (and/or other relay eNBs) with access to core network 106. Additionally, as described, relay eNB 104 can provide relay eNB 108 with access to the core network 106 through the donor eNB 102. In an example, however, relay eNB 104 may not be present, and relay eNB 108 can communicate directly with donor eNB 102. In a similar example, there can be multiple relay eNBs 104 between the donor eNB 102 and relay eNB 108. In addition, it is to be appreciated that relay eNB 108 can comprise the components of relay eNB 104 and provide similar functionality, in one example. Moreover, donor eNB 102 can be a macrocell access point, femtocell access point, picocell access point, mobile base station, and/or the like. Relay eNBs 104 (and relay eNB 108) can similarly be mobile or stationary relay nodes that communicate with donor eNB 102 (and relay eNB 104) over a wireless or wired backhaul, as described.

Donor eNB 102 comprises a TEID request receiving component 502 that obtains a TEID request from one or more relay eNBs specifying a desired TEID, a TEID response generating component 504 that creates a message indicating whether the requested TEID can be utilized, a routing table component 204 that maintains a routing table associating TEIDs to identifiers (e.g., C-RNTI) of related next level downstream relay eNBs, and a packet routing component 208 that routes packets received from the core network 106 based on a TEID specified in the packets.

Relay eNB 104 can include a TEID request/response forwarding component 506 that forwards TEID requests on the uplink and TEID request responses on the downlink, a routing table component 212 that stores associations between TEIDs and identifiers (e.g., C-RNTI) of related next level downstream relay eNBs, and a packet routing component 214 that forwards packets from an upstream eNB to the next level downstream relay eNB based at least in part on a TEID specified in the packets.

Relay eNB 108 comprises a TEID requesting component 508 that generates a request for a TEID (e.g., related to a UE 110 and/or a bearer thereof) and transmits the request to one or more eNBs, a TEID response receiving component 510 that obtains messages indicating whether the request TEID can be utilized for communicating packets for the UE 110 or related bearers throughout the wireless network, a routing table component 218 that associates the TEID to an identifier (e.g., C-RNTI) of the related UE 110 or bearer thereof, and a packet routing component 220 that communicates packets received from upstream eNBs to the UE 110 based at least in part on a TEID specified in the packets.

According to an example, relay eNB 108 can request access to core network 106 using relay eNB 104 (if present) to communicate with donor eNB 102. In one example, relay eNB 108 can formulate such a request based at least in part on the UE 110 (or other device) transmitting a request to relay eNB 108. To this end, TEID requesting component 508 can determine a TEID to be used for the UE or related bearer and can transmit a request for the TEID. TEID request/response forwarding component 506 can receive the request for TEID and forward to the donor eNB 102. It is to be appreciated that where there are multiple relay eNBs between relay eNB 108 and donor eNB 102, each relay eNB can forward the TEID request upstream.

TEID request receiving component 502 can obtain the TEID request and can determine whether the TEID is usable. This can include, for example, ensuring the TEID is not used by another relay eNB or related bearer, ensuring the TEID conforms to a specification utilized by the donor eNB 102, and/or the like. TEID response generating component 504 can create a message indicating whether the TEID can be utilized and transmit the message to the next downstream relay eNB (relay eNB 104 if present). If not, in one example, TEID response generating component 504 can include a usable TEID or range of TEIDs in the message. Routing table component 204, for example, can store the requested TEID, if usable, the indicated usable TEID, or a disparate requested TEID along with an association to an identifier of relay eNB 104, as described.

TEID request/response forwarding component 506 can obtain the TEID response message, if relay eNB 104 is present, and forward the message to its next downstream relay eNB 108. TEID response receiving component 510 can obtain the TEID response message and determine whether the TEID is usable. If so, routing table component 218 can associate the TEID with the UE 110 and/or related bearer identification. If not, routing table component 218 can associate the provided TEID with the UE 110/bearer identity, if the message specifies a usable TEID. If no usable TEID is present in the message, TEID requesting component 508 can request a disparate TEID. In any case, once a TEID is associated, donor eNB 102 can include the TEID in requests to core network 106 for the relay eNB 108.

In an example, donor eNB 102 can receive a packet from a core network 106 having a specified TEID, such as a response packet to the original request of UE 110. Packet routing component 208 can extract the TEID from the packet, and routing table component 204 can determine the related identifier for downstream relay eNB based on the TEID. Accordingly, donor eNB 102 can forward the packet (or transmit the packet over a new transport layer, as described) to relay eNB 104 if present, or relay eNB 108 if relay eNB 104 is not present. Where relay eNB 104 is present, it can receive the packet. Packet routing component 214 can similarly extract the TEID from the packet, and routing table component 212 can determine the next downstream relay eNB based on the TEID. In this example, it is relay eNB 108, but it is to be appreciated that additional layers of relay eNB can be between relay eNB 108 and donor eNB 102. Relay eNB 104 can forward the packet to relay eNB 108. Whether relay eNB 108 receives the packet from relay eNB 104 or donor eNB 102 (where relay eNB 104 is not present), packet routing component 220 can extract the TEID from the packet. Routing table component 218 can match the TEID to an identifier for UE 110 and/or a related radio bearer. Packet routing component 220 can accordingly provide the packet to UE 110.

Figure 6:
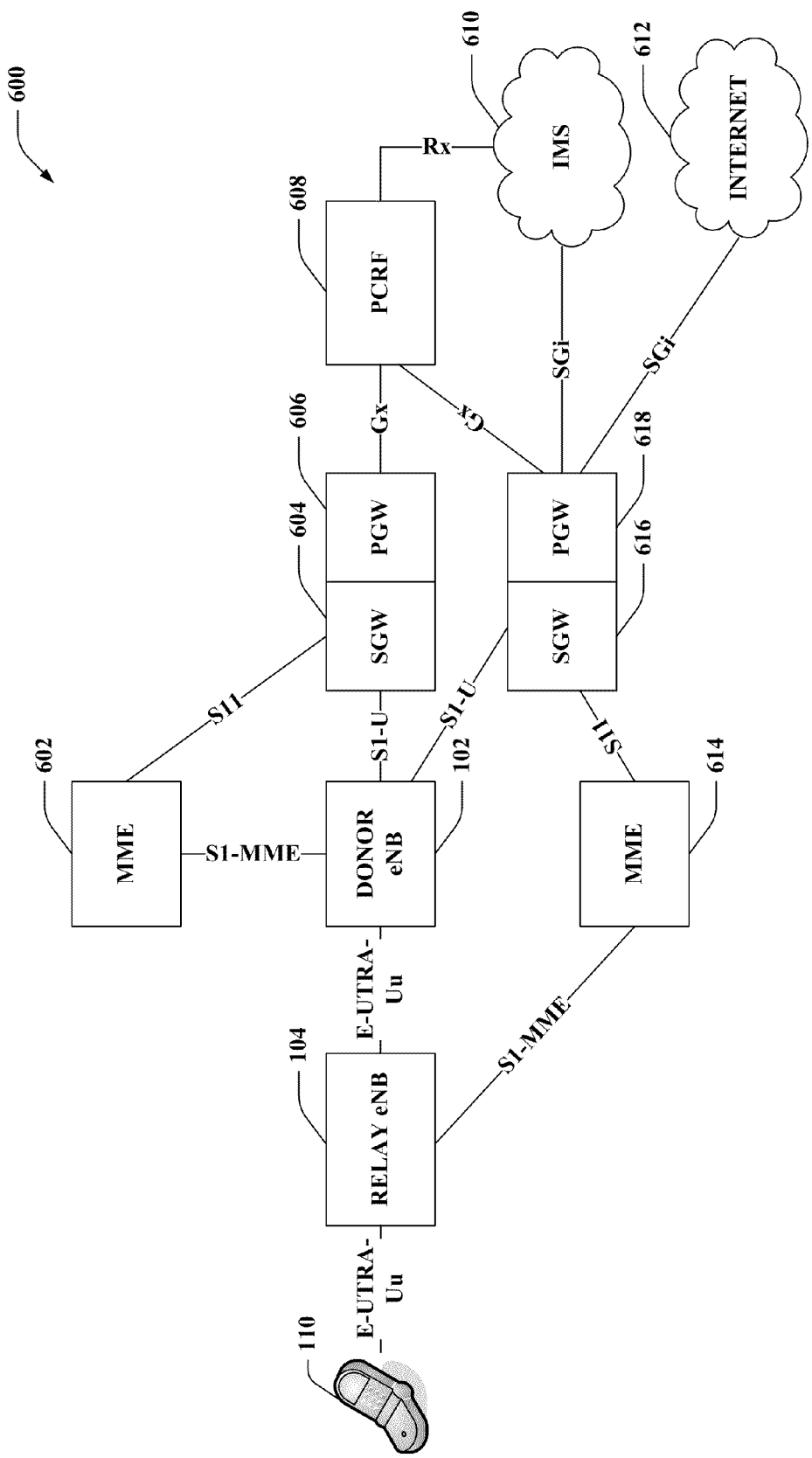
FIG. 6 is an illustration of an example wireless communications system that utilizes cell relays to provide access to a wireless network.

Now turning to FIG. 6, an example wireless communication network 600 that provides cell relay functionality is depicted. Network 600 includes a UE 110 that communicates with a relay eNB 104, as described, to receive access to a wireless network. Relay eNB 104 can communicate with a donor eNB 102 to provide access to a wireless network, and as described, donor eNB 102 can communicate with an MME 602 and/or SGW 604 that relate to the relay eNB 104. SGW 604 can connect to or be coupled with a PGW 606, which provides network access to SGW 604 and/or additional SGWs. PGW 606 can communicate with a PCRF 608 to authenticate/authorize UE 110 to use the network, which can utilize an IMS 610 to provide addressing to the UE 110 and/or relay eNB 104.

According to an example, MME 602 and/or SGW 604 and PGW 606 can be related to donor eNB 102 serving substantially all relay eNBs in the cluster. Donor eNB 102 can also communicate with an SGW 616 and PGW 618 that relate to the UE 110, such that the PGW 618 can assign UE 110 a network address to facilitate tunneling communications thereto through the relay eNB 104, donor eNB 102, and SGW 616. Moreover, for example, SGW 616 can communicate with an MME 614 to facilitate control plane communications to and from the UE 110. It is to be appreciated that MME 602 and MME 614 can be the same MME, in one example. PGW 618 can similarly communicate with a PCRF 608 to authenticate/authorize UE 110, which can communicate with an IMS 610. In addition, PGW 618 can communicate directly with the IMS 610 and/or internet 612.

In an example, UE 110 can communicate with the relay eNB 104 over an E-UTRA-Uu interface, as described, and the relay eNB 104 can communicate with the donor eNB 102 using an E-UTRA-Uu interface or other interface. Donor eNB 102 communicates with the MME 602 using an S1-MME interface and the SGW 604 and PGW 606 over an S1-U interface, as depicted. The transport layers used over the S1-MME and S1-U interfaces are terminated at the donor eNB 102, as described. In this regard, upon receiving communications for the relay eNB 104 from the MME 602 or SGW 604, donor eNB 102 decouples the application layer from the transport layer by defining a new transport layer packet and transmitting the application layer communication to the relay eNB 104 in the new transport layer packet (over the E-UTRA-Uu interface, in one example).

Upon transmitting control plane communications from the relay eNB 104 to the MME 602, donor eNB 102 can indicate an identifier of the relay eNB 104 (e.g., in an S1-AP message), and MME 602 can transmit the identifier in responding communications to the donor eNB 102. When transmitting data plane communications from relay eNB 104 to SGW 604, donor eNB 102 can insert an identifier for the relay eNB 104 (or UE 110 or one or more related bearers) in the TEID of a GTP-U header to identify the relay eNB 104 (or UE 110 or one or more related bearers). This can be done using one or more of the mechanisms described above, such as a TEID comprising a suffix generated by relay eNB 104 and a prefix of donor eNB 102, a TEID assigned by donor eNB 102, a TEID requested by relay eNB 104, and/or the like. SGW 604 can transmit the TEID in a responding GTP-U header such that donor eNB 102 can determine the relay eNB 104, or one or more downstream relay eNBs is to receive the translated packet, as described above. For example, this can be based at least in part on locating at least a portion of the TEID in a routing table at donor eNB 102. These foregoing functionalities can mitigate the need for UDP/IP routing on the backhaul link between various eNBs, for example. In addition, headers can be compressed, in one example, as described. As shown, MME 602 can communicate with SGW 604, and MME 614 to SGW 616, using an S11 interface. PGWs 606 and 618 can communicate with PCRF 608 over a Gx interface. Furthermore, PCRF 608 can communicate with IMS 610 using an Rx interface, and PGW 618 can communicate with IMS 610 and/or the internet 612 using an SGi interface.

Figure 7:
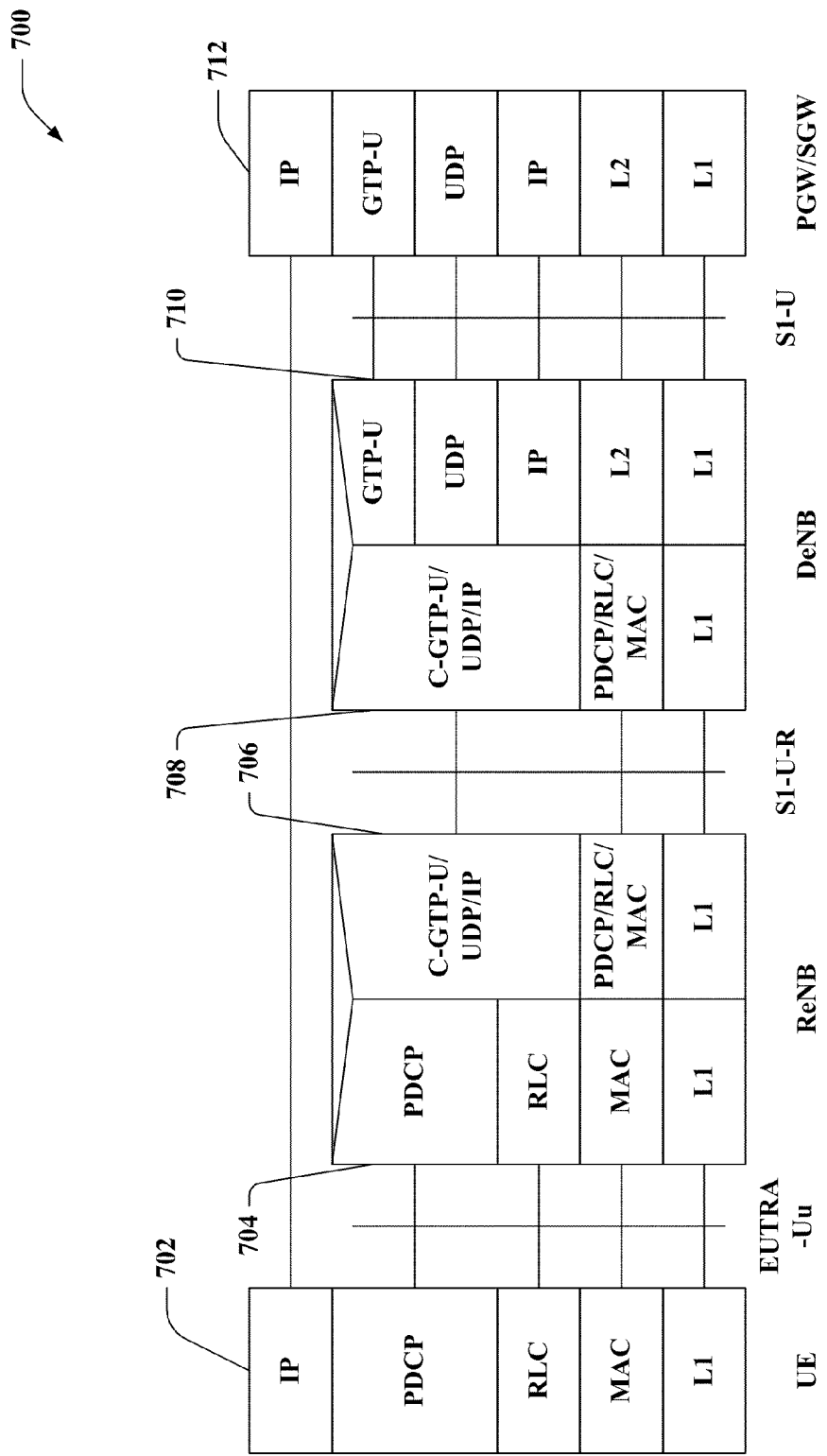
FIG. 7 is an illustration of example protocol stacks that facilitate providing cell relay functionality for data plane communications.

Referring to FIG. 7, example protocol stacks 700 are illustrated that facilitate communicating in a wireless network to provide cell relay functionality for data (e.g., user) plane communications. A UE protocol stack 702 is shown comprising an L1 layer, MAC layer, an RLC layer, a PDCP layer, and an IP layer. A relay eNB (ReNB) access link protocol stack 704 is depicted having an L1 layer, MAC layer, RLC layer, and PDCP layer, as well as an ReNB backhaul link protocol stack 706 having an L1 layer, PDCP/RLC/MAC layer, and a C-GTP-U/UDP/IP layer, which can be a compressed layer in one example, to facilitate routing packets on the backhaul (e.g., by populating the TEID with the ReNB address, as described previously). A donor eNB (DeNB) access link protocol stack 708 is also shown having an L1 layer, PDCP/RLC/MAC layer, and a C-GTP/UDP/IP layer, as well as a DeNB backhaul link protocol stack 710 having an L1 layer, L2 layer, an IP layer, a UDP layer, and a GTP-U layer to maintain communications with a PGW/SGW using an address assigned by the PGW/SGW. PGW/SGW protocol stack 712 has an L1 layer, L2, layer, IP layer related to an address assigned to the DeNB, UDP layer, GTP-U layer, and another IP layer related to an address assigned to the UE.

According to an example, a UE can communicate with an ReNB to receive access to a PGW/SGW. In this regard, UE can communicate over L1, MAC, RLC, and PDCP layers with the ReNB over using a EUTRA-Uu interface, as shown between protocol stacks 702 and 704. The UE can tunnel IP layer communications through the ReNB and other entities to the PGW/SGW, which assigns an IP address to the UE, as shown between protocol stacks 702 and 712. To facilitate such tunneling, the ReNB communicates with a DeNB over L1, PDCP/RLC/MAC, and C-GTP-U/UDP/IP layers using an S1-U-R interface, as shown between protocol stacks 706 and 708. As described, the S1-U-R interface can be a newly defined interface that utilizes a disparate transport layer than communications between DeNB and PGW/SGW. In this regard, communications between ReNB and DeNB additionally use a compressed version of the GTP-U, UDP/IP headers. Moreover, this compressed header can indicate TEID, as described herein, of the ReNB in the GTP-U header to facilitate return communications, as described, herein. DeNB can decouple the C-GTP-U/UDP/IP header from the transport layer and communicate with the PGW over separate GTP-U, UDP, and IP layers on top of L1 and L2 physical layers over an S1-U interface, as shown between protocol stacks 710 and 712. The same can be true for downlink communications, as described, where DeNB decouples the GTP, UDP, and IP layers from the transport layers, compresses them into a C-GTP-U/UDP/IP header, and transmits over the PDCP/RLC/MAC and L1 layers to the ReNB. DeNB, as described, can use a TEID in the GTP-U header to route the packet to the ReNB. In one example, this mitigates the need for UDP/IP routing on the backhaul, etc.

Referring to FIGS. 8-11, methodologies relating to providing protocol routing in relay node configurations are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 8:
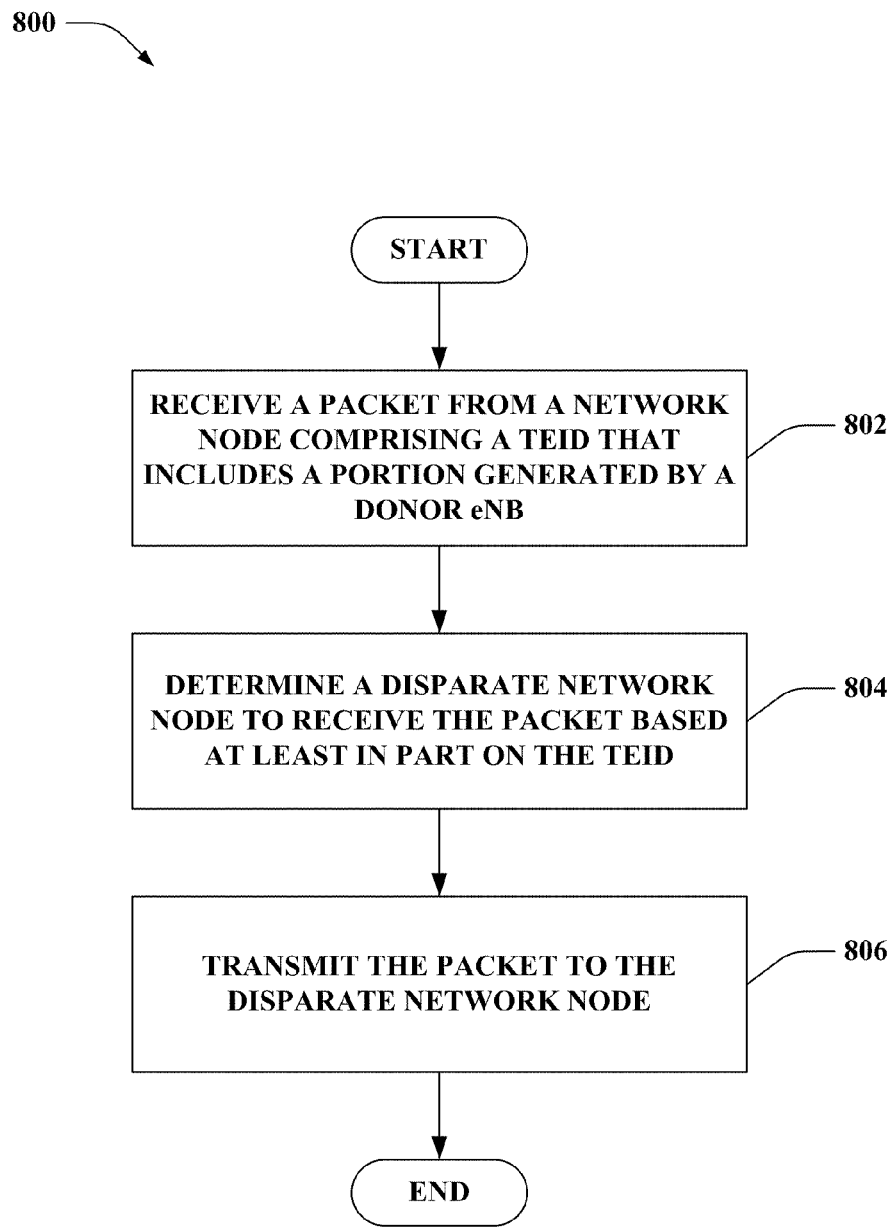
FIG. 8 is an illustration of an example methodology for routing packets according to a TEID in the packets.

Turning to FIG. 8, an example methodology 800 that facilitates routing packets based on a received TEID or portion thereof in a relay environment is illustrated. At 802, a packet can be received from a network node comprising a TEID that includes a portion generated by a donor eNB. As described, the packet can be received from an upstream node, such as one or more eNBs. In addition, the TEID can comprise a prefix and/or suffix assigned by disparate eNBs, as described. In another example, the TEID can be assigned by the donor eNB (e.g., based on a request from a relay communicating with a relevant UE, or otherwise). At 804, a disparate network node to receive the packet can be determined based at least in part on the TEID. As described, the TEID, or a portion thereof (e.g., prefix or suffix) can be stored in a routing table along with an identifier of the disparate network node. Thus, for example, the disparate network node can be identified based at least in part on locating the TEID, or portion thereof, in the routing table. At 806, the packet can be transmitted to the disparate network node.

Figure 9:
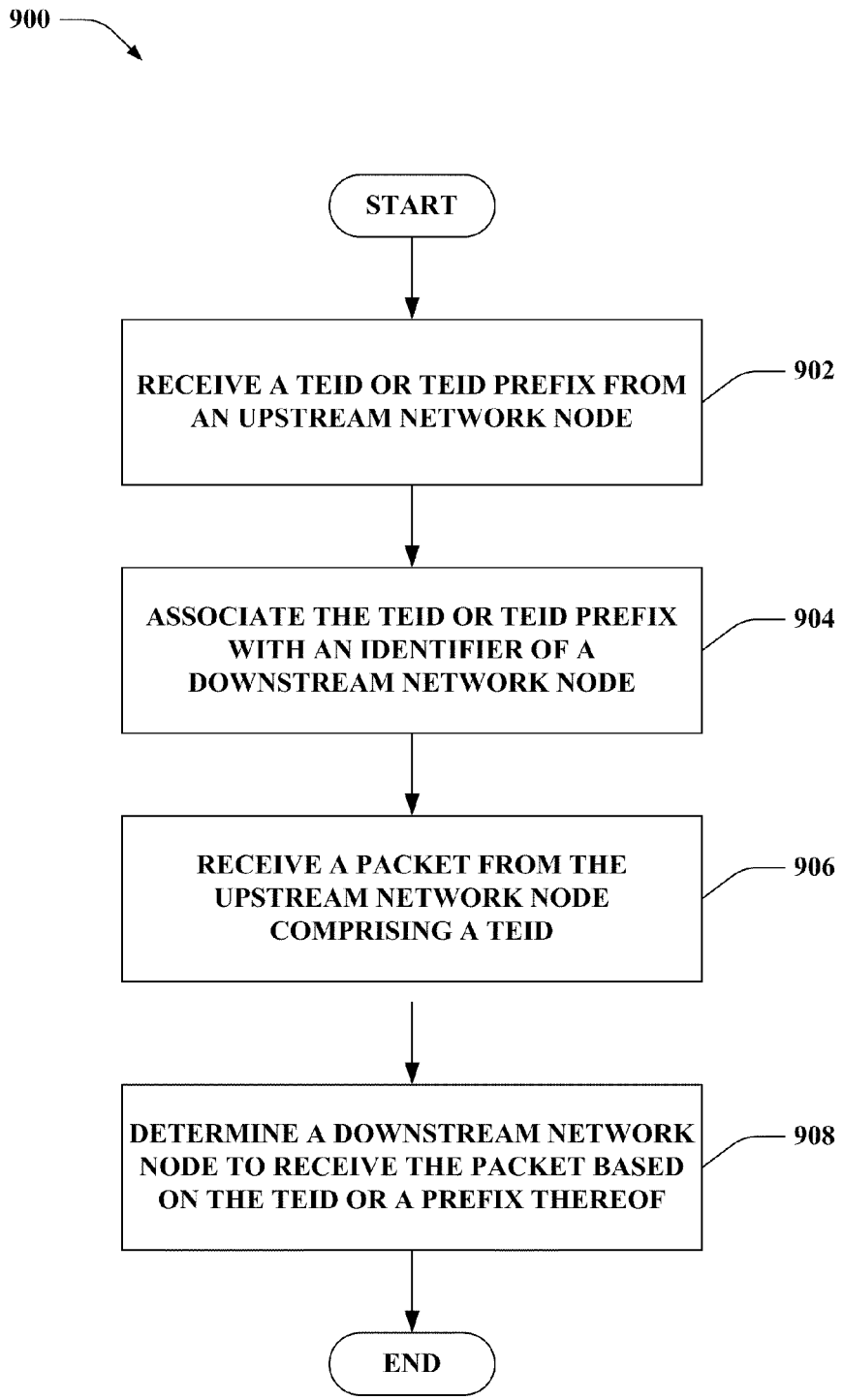
FIG. 9 is an illustration of an example methodology that creates associations for routing packets based on TEID.

Referring to FIG. 9, an example methodology 900 is shown that facilitates associating TEIDs with downstream network node identifiers for subsequent routing. At 902, a TEID or TEID prefix can be received from an upstream network node. For example, the TEID or TEID prefix can be assigned by the upstream network node (or a disparate upstream network node) to a downstream node for communicating via relay nodes, as described. In one example, this can be based on a request received from the downstream network node at the upstream network node, as described. At 904, the TEID or TEID prefix can be associated with an identifier of a downstream network node. This can be, for example, a next downstream hop towards a related UE or other device and can be associated in a routing table or similar structure. At 906, a packet can be received from the upstream network node comprising a TEID. At 908, a downstream network node to receive the packet can be determined based on the TEID or a prefix thereof, as described. In one example, the TEID or TEID prefix can relate to that originally received from the upstream network node, and the downstream network node can be determined based on the previous association.

Figure 10:
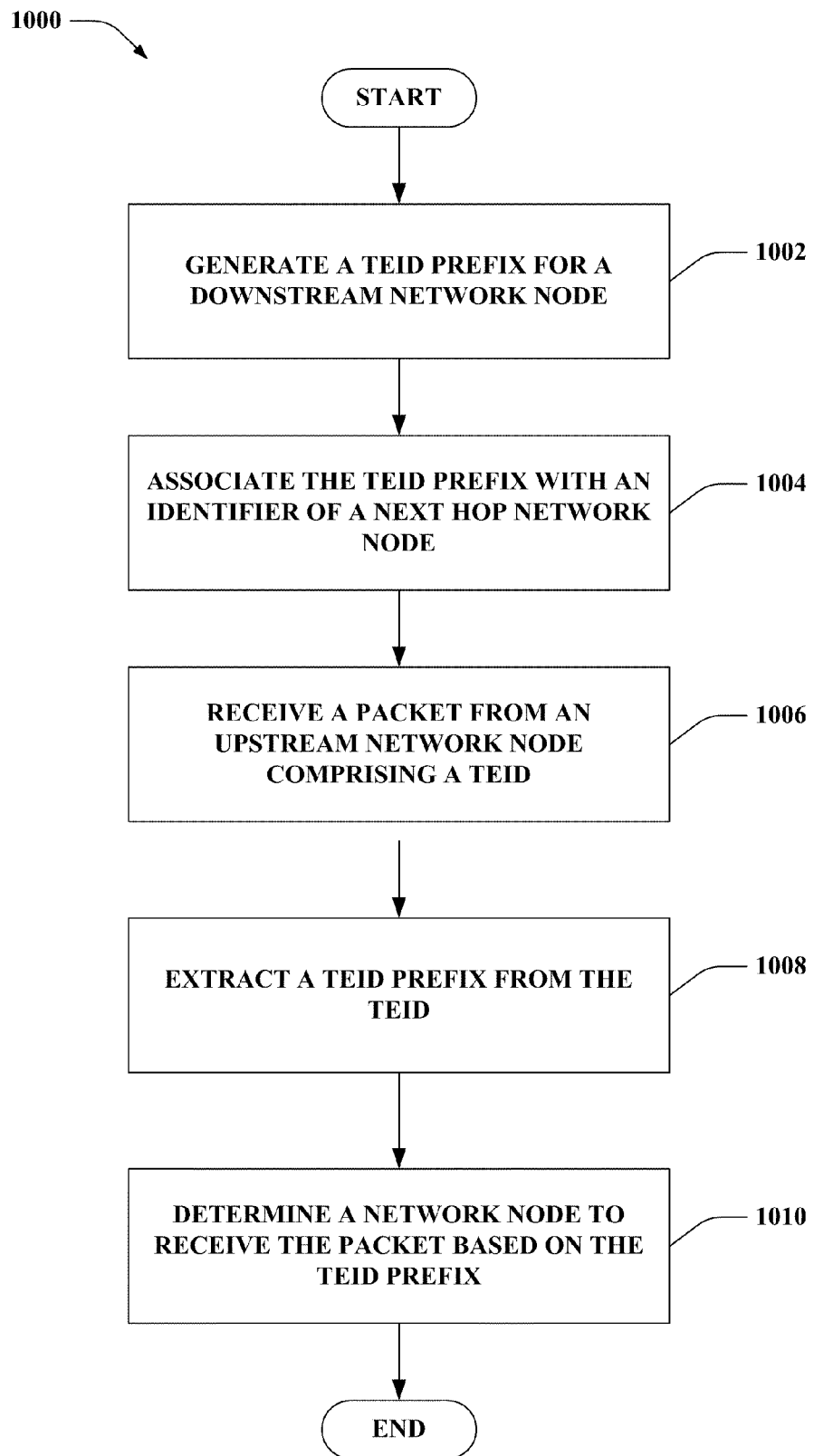
FIG. 10 is an illustration of an example methodology that generates TEID portions for subsequent routing of packets based on TEID.

Turning to FIG. 10, an example methodology 1000 that facilitates generating TEID prefixes for enhanced packet routing is illustrated. At 1002, a TEID prefix is generated for a downstream network node. As described, this can be at a donor eNB level, at each relay eNB in a path from an eNB that communicates with a UE to the donor eNB, and/or the like. At 1004, the TEID prefix can be associated with an identifier of a next hop network node. This can be a downstream network node, as described. At 1006, a packet can be received from an upstream network node comprising a TEID. At 1008, a TEID prefix can be extracted from the TEID. A network node to receive the packet can be determined, at 1010, based on the prefix. In one example, the TEID prefix can be the same prefix associated with the identifier of the next hop network node at 1004. In this case, the next hop network node can be the network node to receive the packet.

Figure 11:
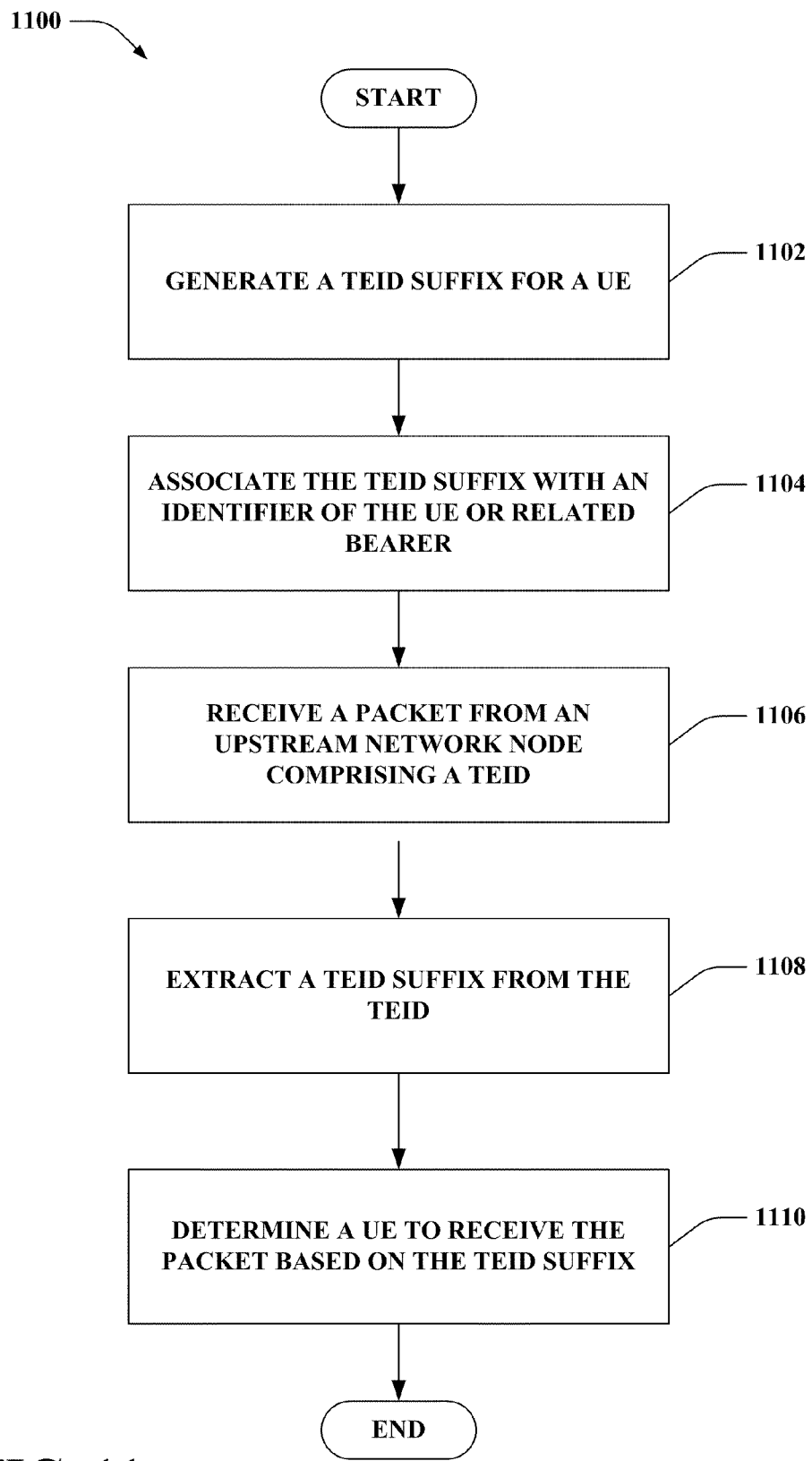
FIG. 11 is an illustration of an example methodology that generates TEID suffixes for routing packets to UEs or other devices.

Referring to FIG. 11, an example methodology 1100 is shown that facilitates routing packets to a UE using a TEID in a relay configuration. At 1102, a TEID suffix can be generated for a UE. At 1104, the TEID suffix can be associated with an identifier of the UE or related bearer. In one example, the TEID suffix can be provided to one or more upstream nodes for associating with downlink packets and associated with the identifier in a routing table. At 1106, a packet can be received from an upstream network node comprising a TEID. At 1108, a TEID suffix can be extracted from the TEID, and a UE to receive the packet can be determined based on the TEID suffix at 1110 (e.g., based on the routing table).

It will be appreciated that, in accordance with one or more aspects described herein, inferences can be made regarding generating a TEID or a portion thereof, determining one or more network nodes related to a TEID, and/or other aspects described herein. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
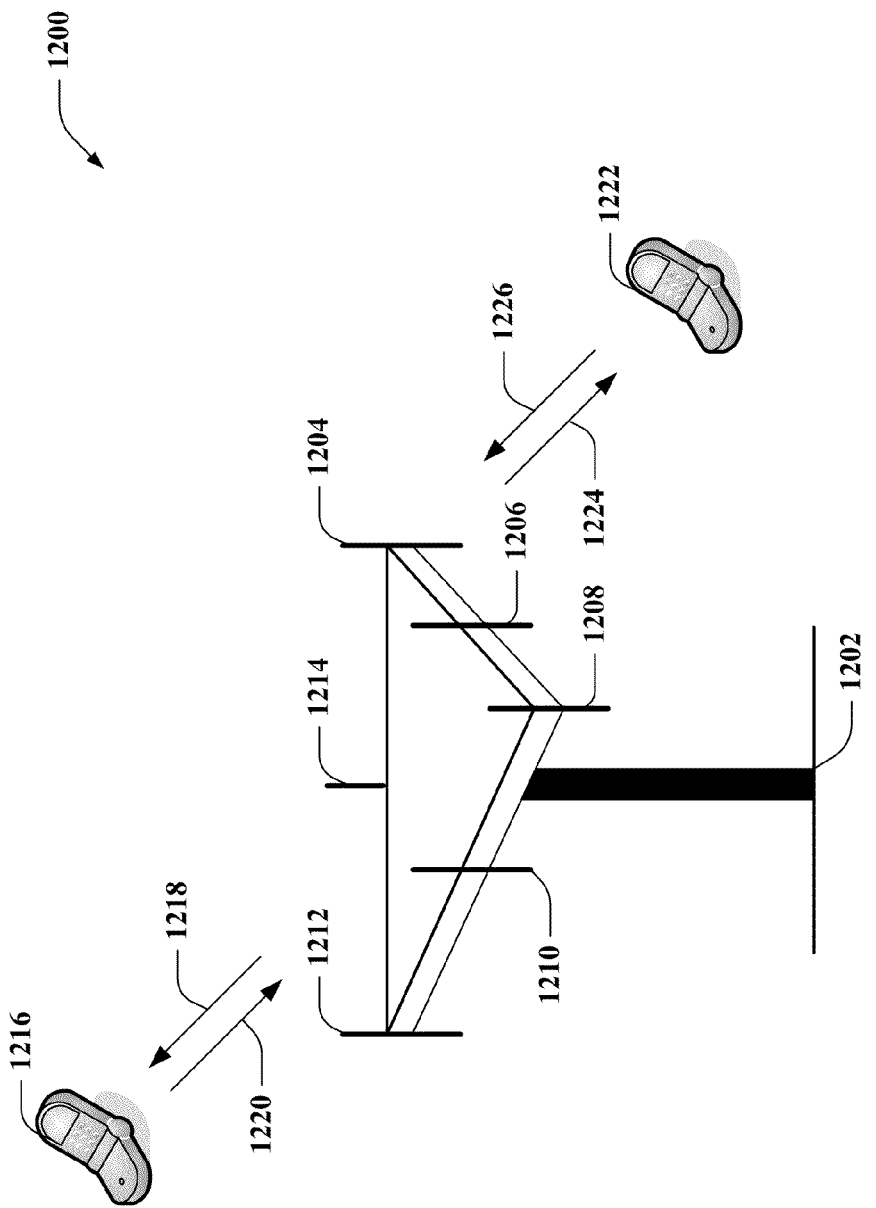
FIG. 12 is an illustration of a wireless communication system in accordance with various aspects set forth herein.

Referring now to FIG. 12, a wireless communication system 1200 is illustrated in accordance with various embodiments presented herein. System 1200 comprises a base station 1202 that can include multiple antenna groups. For example, one antenna group can include antennas 1204 and 1206, another group can comprise antennas 1208 and 1210, and an additional group can include antennas 1212 and 1214. Two antennas are illustrated for each antenna group; however, more or fewer antennas can be utilized for each group. Base station 1202 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1202 can communicate with one or more mobile devices such as mobile device 1216 and mobile device 1222; however, it is to be appreciated that base station 1202 can communicate with substantially any number of mobile devices similar to mobile devices 1216 and 1222. Mobile devices 1216 and 1222 can be, for example, cellular phones, smart phones, laptops, handheld communication devices, handheld computing devices, satellite radios, global positioning systems, PDAs, and/or any other suitable device for communicating over wireless communication system 1200. As depicted, mobile device 1216 is in communication with antennas 1212 and 1214, where antennas 1212 and 1214 transmit information to mobile device 1216 over a forward link 1218 and receive information from mobile device 1216 over a reverse link 1220. Moreover, mobile device 1222 is in communication with antennas 1204 and 1206, where antennas 1204 and 1206 transmit information to mobile device 1222 over a forward link 1224 and receive information from mobile device 1222 over a reverse link 1226. In a frequency division duplex (FDD) system, forward link 1218 can utilize a different frequency band than that used by reverse link 1220, and forward link 1224 can employ a different frequency band than that employed by reverse link 1226, for example. Further, in a time division duplex (TDD) system, forward link 1218 and reverse link 1220 can utilize a common frequency band and forward link 1224 and reverse link 1226 can utilize a common frequency band.

Each group of antennas and/or the area in which they are designated to communicate can be referred to as a sector of base station 1202. For example, antenna groups can be designed to communicate to mobile devices in a sector of the areas covered by base station 1202. In communication over forward links 1218 and 1224, the transmitting antennas of base station 1202 can utilize beamforming to improve signal-to-noise ratio of forward links 1218 and 1224 for mobile devices 1216 and 1222. Also, while base station 1202 utilizes beamforming to transmit to mobile devices 1216 and 1222 scattered randomly through an associated coverage, mobile devices in neighboring cells can be subject to less interference as compared to a base station transmitting through a single antenna to all its mobile devices. Moreover, mobile devices 1216 and 1222 can communicate directly with one another using a peer-to-peer or ad hoc technology (not shown).

According to an example, system 1200 can be a multiple-input multiple-output (MIMO) communication system. Further, system 1200 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1202 can communicate to the mobile devices 1216 and 1222 over the channels, which can be create for various types of data. For example, channels can be created for communicating various types of general communication data, control data (e.g., quality information for other channels, acknowledgement indicators for data received over channels, interference information, reference signals, etc.), and/or the like.

Figure 13:
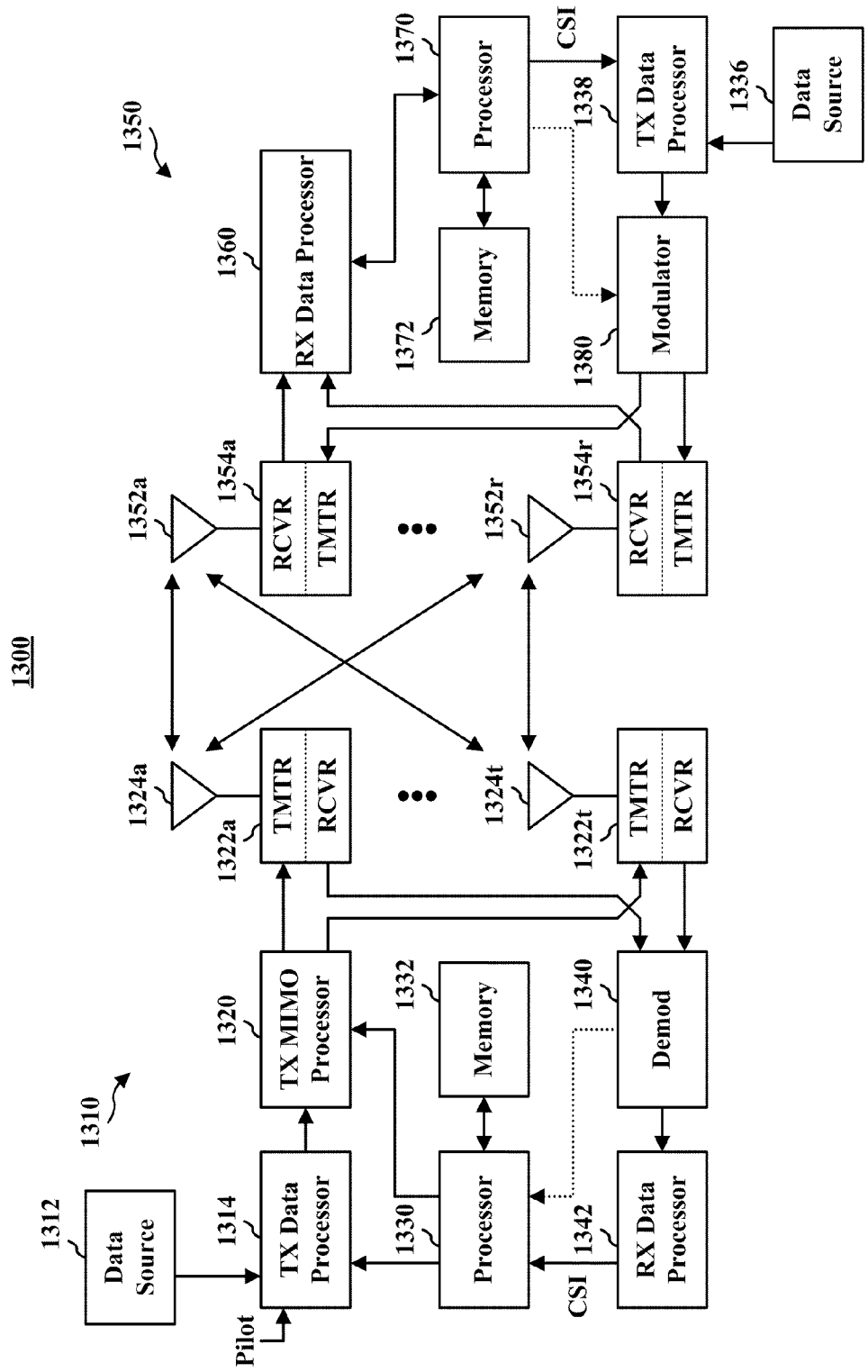
FIG. 13 is an illustration of an example wireless network environment that can be employed in conjunction with the various systems and methods described herein.

FIG. 13 shows an example wireless communication system 1300. The wireless communication system 1300 depicts one base station 1310 and one mobile device 1350 for sake of brevity. However, it is to be appreciated that system 1300 can include more than one base station and/or more than one mobile device, wherein additional base stations and/or mobile devices can be substantially similar or different from example base station 1310 and mobile device 1350 described below. In addition, it is to be appreciated that base station 1310 and/or mobile device 1350 can employ the systems (FIGS. 1-6 and 12), protocol stacks (FIG. 7) and/or methods (FIGS. 8-11) described herein to facilitate wireless communication therebetween.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various aspects, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At mobile device 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which precoding matrix to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from mobile device 1350 are received by antennas 1324, conditioned by receivers 1322, demodulated by a demodulator 1340, and processed by a RX data processor 1342 to extract the reverse link message transmitted by mobile device 1350. Further, processor 1330 can process the extracted message to determine which precoding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

It is to be understood that the aspects described herein can be implemented in hardware, software, firmware, middleware, microcode, or any combination thereof For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
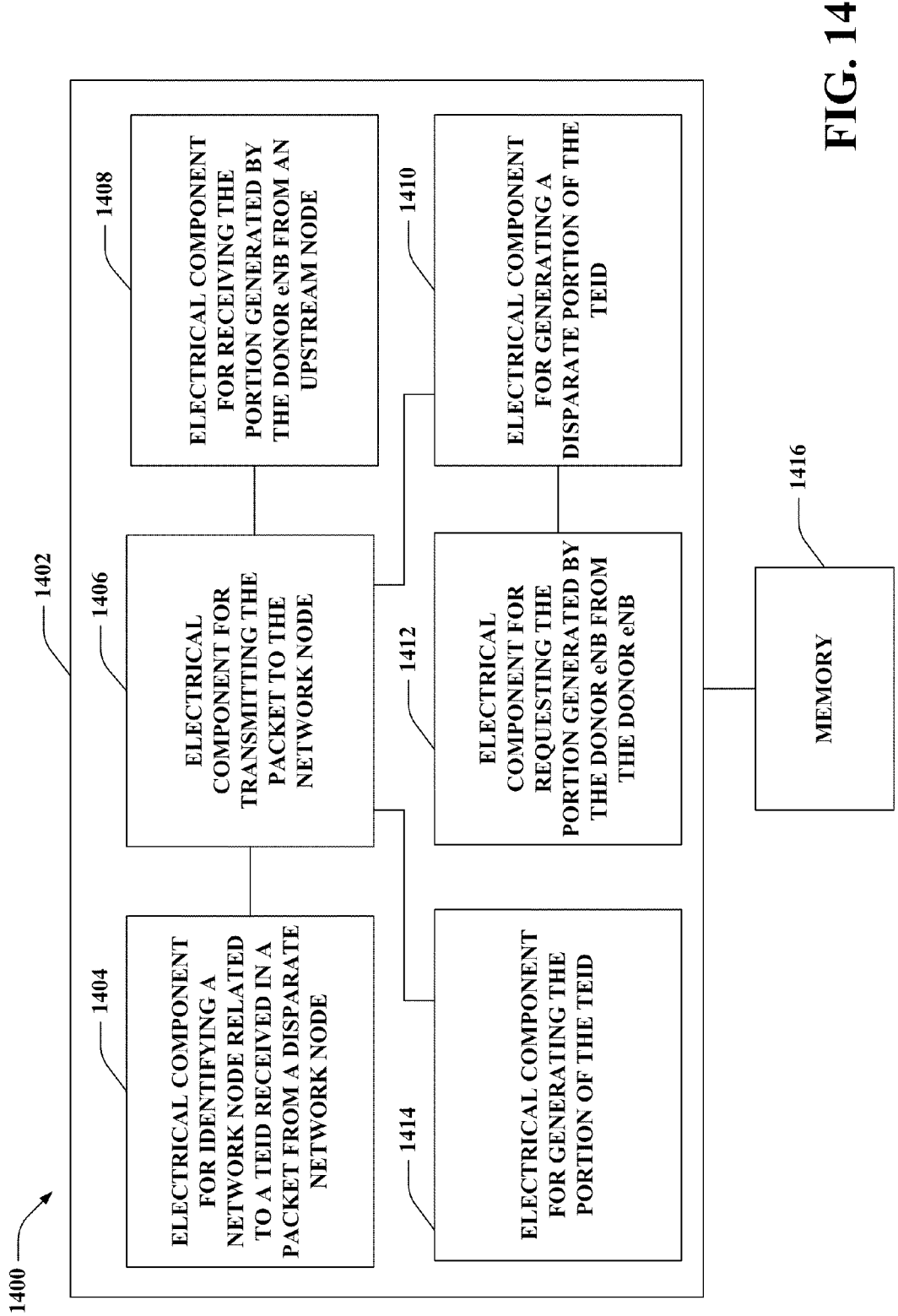
FIG. 14 is an illustration of an example system that facilitates routing packets among eNBs according to TEID.

With reference to FIG. 14, illustrated is a system 1400 that facilitates routing packets among relay eNBs. For example, system 1400 can reside at least partially within a base station, mobile device, etc. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for identifying a network node related to a TEID received in a packet from a disparate network node 1404. For example, as described, the TEID can comprise a portion assigned by a donor eNB. In another example, the TEID can also comprise a portion assigned by one or more relay eNBs (e.g., multiple prefixes, a suffix, etc., as described previously). Electrical component 1404 can identify the network node based at least in part on locating the TEID or a portion thereof (e.g., prefix or suffix) in a routing table. As described, the routing table can associate TEIDs or related portions to identifiers of disparate downstream network nodes. Additionally, logical grouping 1402 can include an electrical component for transmitting the packet to the network node 1406.

Moreover, logical grouping 1402 can include an electrical component for receiving the portion generated by the donor eNB from an upstream node 1408. Thus, for example, the TEID portion (e.g., prefix) can be generated at a higher level and sent to electrical component 1408. Electrical component 1404, as described, can store the received TEID portion with an identifier for the next hop network node (e.g., to which electrical component 1406 transmits the packet based on the received TEID). In addition, logical grouping 1402 can include an electrical component for generating a disparate portion of the TEID 1410. In this regard, when a packet is received with a TEID, electrical component 1404 can analyze the disparate portion obtaining the generated portion and can locate the portion in the routing table, as described. In addition, logical grouping 1402 can include an electrical component for requesting the portion generated by the donor eNB from the donor eNB 1412. Moreover, logical grouping 1402 can include an electrical component for generating the portion of the TEID 1414. Thus, system 1400 can create the TEID for one or more downstream relay eNBs, in one example. Additionally, system 1400 can include a memory 1416 that retains instructions for executing functions associated with electrical components 1404, 1406, 1408, 1410, 1412, and 1414. While shown as being external to memory 1416, it is to be understood that one or more of electrical components 1404, 1406, 1408, 1410, 1412, and 1414 can exist within memory 1416.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
   receiving a packet from a network node comprising a tunnel endpoint identifier (TEID) that includes at least a portion generated by a donor evolved Node B (eNB) and a disparate portion generated by a relay eNB;
   determining a disparate network node to receive the packet based at least in part on the TEID;
   comparing the portion generated by the donor eNB to a routing table associating one or more TEID portions with identifiers of network nodes, wherein the determining the disparate network node is based at least in part on locating the portion generated by the donor eNB in the routing table; and
   transmitting the packet to the disparate network node.

2. The method of claim 1, further comprising:
   receiving the portion generated by the donor eNB from an upstream network node; and
   storing the portion generated by the donor eNB in the routing table along with an identifier of the disparate network node.

3. The method of claim 1, further comprising:
   storing the disparate portion along with an identifier of the disparate network node in another routing table comprising one or more portions of TEIDs and related identifiers of next hop network nodes.

4. The method of claim 3, wherein the determining the disparate network node includes locating the disparate portion of the TEID in the other routing table associated with the identifier of the disparate network node.

5. The method of claim 3, wherein the disparate network node is a user equipment (UE), and the storing the disparate portion along with the identifier includes storing the disparate portion in the other routing table along with a radio bearer identifier related to the UE.

6. The method of claim 5, further comprising requesting the portion generated by the donor eNB from the donor eNB.

7. A method, comprising:
   receiving a packet from a network node comprising a tunnel endpoint identifier (TEID) that includes at least a portion generated by a donor evolved Node B (eNB);
   determining a disparate network node to receive the packet based at least in part on the TEID;
   generating a disparate portion of the TEID;
   storing the disparate portion along with an identifier of the disparate network node in a routing table comprising one or more portions of TEIDs and related identifiers of next hop network nodes, wherein the disparate network node is a user equipment (UE), and the storing the disparate portion along with the identifier includes storing the disparate portion in the routing table along with a radio bearer identifier related to the UE;
   transmitting the packet to the disparate network node; and
   receiving an access request from the UE, wherein the generating the disparate portion of the TEID is based at least in part on the access request.

8. A method, comprising:
   receiving a packet from a network node comprising a tunnel endpoint identifier (TEID) that includes at least a portion generated by a donor evolved Node B (eNB);
   determining a disparate network node to receive the packet based at least in part on the TEID;
   transmitting the packet to the disparate network node;
   generating the portion of the TEID; and
   storing the portion of the TEID along with an identifier of the disparate network node in a routing table comprising one or more portions of TEIDs and related identifiers of next hop network nodes.

9. The method of claim 8, wherein the identifier is a cell radio network temporary identifier (C-RNTI) of the disparate network node.

10. A wireless communications apparatus, comprising:
    at least one processor configured to:
      obtain a packet from a network node comprising a tunnel endpoint identifier (TEID) having at least a portion assigned by a donor evolved Node B (eNB) and a disparate portion, with respect to the portion assigned by the donor eNB, assigned by a relay eNB;
      identify a disparate network node related to the TEID;
      locate the portion assigned by the donor eNB in a routing table associating one or more TEID portions with identifiers of network nodes, wherein the at least one processor identifies the disparate network node based at least in part on locating the portion assigned by the donor eNB in the routing table; and
      transmit the packet to the disparate network node; and
    a memory coupled to the at least one processor.

11. The wireless communications apparatus of claim 10, wherein the at least one processor is further configured to:
    obtain the portion assigned by the donor eNB from an upstream network node; and
    store the portion assigned by the donor eNB in the routing table with an identifier of the disparate network node.

12. The wireless communications apparatus of claim 10, wherein the at least one processor is further configured to:
store an association between the disparate portion of the TEID and an identifier of the disparate network node in another routing table.

13. The wireless communications apparatus of claim 12, wherein the at least one processor identifies the disparate network node at least in part by locating the disparate portion of the TEID in the other routing table and extracting the identifier of the disparate network node based on the association.

14. The wireless communications apparatus of claim 12, wherein the disparate network node is a user equipment (UE), and the identifier corresponds at least in part to a radio bearer of the UE.

15. A wireless communications apparatus, comprising:
at least one processor configured to:
obtain a packet from a network node comprising a tunnel endpoint identifier (TEID) having at least a portion assigned by a donor evolved Node B (eNB);
identify a disparate network node related to the TEID;
transmit the packet to the disparate network node;
assign the portion of the TEID; and
store an association between the portion of the TEID and an identifier of the disparate network node in a routing table; and
a memory coupled to the at least one processor.

16. The wireless communications apparatus of claim 15, wherein the identifier is a cell radio network temporary identifier (C-RNTI) of the disparate network node.

17. An apparatus, comprising:
means for identifying a network node related to a tunnel endpoint identifier (TEID) received in a packet from a disparate network node, wherein the TEID includes a portion generated by a donor evolved Node B (eNB) and a disparate portion, with respect to the portion generated by the donor eNB, generated by a relay eNB, wherein the means for identifying the network node further maintains a routing table comprising TEID portions associated with identifiers of related network nodes, locates the portion generated by the donor eNB in the routing table, and identifies the network node based on an identifier associated with the portion generated by the donor eNB in the routing table; and
means for transmitting the packet to the network node.

18. The apparatus of claim 17, further comprising means for receiving the portion generated by the donor eNB from an upstream node, wherein the means for identifying the network node stores the portion generated by the donor eNB in the routing table along with the identifier of the network node.

19. The apparatus of claim 17, wherein the means for identifying the network node stores the disparate portion of the TEID along with an identifier of the network node.

20. The apparatus of claim 19, wherein the means for identifying the network node locates the disparate portion of the TEID, along with an association to the identifier of the network node, in another routing table.

21. The apparatus of claim 19, wherein the network node is a user equipment (UE), and the means for identifying the network node stores the disparate portion of the TEID with a radio bearer identifier related to the UE.

22. An apparatus, comprising:
means for identifying a network node related to a tunnel endpoint identifier (TEID) received in a packet from a disparate network node, wherein the TEID includes a portion generated by a donor evolved Node B (eNB), wherein the network node is a user equipment (UE), and the means for identifying the network node stores the disparate portion of the TEID with a radio bearer identifier related to the UE;
means for transmitting the packet to the network node;
means for generating a disparate portion of the TEID, wherein the means for identifying the network node stores the disparate portion of the TEID along with an identifier of the network node, wherein the means for generating the disparate portion of the TEID generates the disparate portion of the TEID based at least in part on receiving an access request from the UE.

23. The apparatus of claim 21, further comprising means for requesting the portion generated by the donor eNB from the donor eNB.

24. An apparatus, comprising:
means for identifying a network node related to a tunnel endpoint identifier (TEID) received in a packet from a disparate network node, wherein the TEID includes a portion generated by a donor evolved Node B (eNB);
means for transmitting the packet to the network node; and
means for generating the portion of the TEID, wherein the means for identifying the network node stores the portion of the TEID with an identifier of the network node in a routing table comprising one or more portions of TEIDs and related identifiers of next hop network nodes.

25. The apparatus of claim 24, wherein the identifier is a cell radio network temporary identifier (C-RNTI) of the network node.

26. A computer program product, comprising:
a non-transitory computer-readable medium comprising:
code for causing at least one computer to receive a packet from a network node comprising a tunnel endpoint identifier (TEID) that includes at least a portion generated by a donor evolved Node B (eNB) and a disparate portion, with respect to the portion generated by the donor eNB, generated by a relay eNB;
code for causing the at least one computer to determine a disparate network node to receive the packet based at least in part on the TEID;
code for causing the at least one computer to compare the portion generated by the donor eNB to a routing table associating one or more TEID portions with identifiers of network nodes, wherein the code for causing the at least one computer to determine the disparate network node determines the disparate network node based at least in part on locating the portion generated by the donor eNB in the routing table; and
code for causing the at least one computer to transmit the packet to the disparate network node.

27. The computer program product of claim 26, wherein the computer-readable medium further comprises:
code for causing the at least one computer to receive the portion generated by the donor eNB from an upstream network node; and
code for causing the at least one computer to store the portion generated by the donor eNB in the routing table along with an identifier of the disparate network node.

28. The computer program product of claim 26, wherein the computer-readable medium further comprises:
code for causing the at least one computer to store the disparate portion along with an identifier of the disparate network node in another routing table comprising one or more portions of TEIDs and related identifiers of next hop network nodes.

29. The computer program product of claim 28, wherein the code for causing the at least one computer to determine the disparate network node determines the disparate network node at least in part by locating the disparate portion of the TEID in the other routing table associated with the identifier of the disparate network node.

30. The computer program product of claim 28, wherein the disparate network node is a user equipment (UE), and the code for causing the at least one computer to store the disparate portion of the TEID stores the disparate portion of the TEID in the other routing table along with a radio bearer identifier related to the UE.

31. A computer program product, comprising:
a non-transitory computer-readable medium comprising:
code for causing at least one computer to receive a packet from a network node comprising a tunnel endpoint identifier (TEID) that includes at least a portion generated by a donor evolved Node B (eNB);
code for causing the at least one computer to determine a disparate network node to receive the packet based at least in part on the TEID;
code for causing the at least one computer to transmit the packet to the disparate network node;
code for causing the at least one computer to generate a disparate portion of the TEID;
code for causing the at least one computer to store the disparate portion along with an identifier of the disparate network node in a routing table comprising one or more portions of TEIDs and related identifiers of next hop network nodes, wherein the disparate network node is a user equipment (UE), and the code for causing the at least one computer to store the disparate portion of the TEID stores the disparate portion of the TEID in the routing table along with a radio bearer identifier related to the UE; and
code for causing the at least one computer to receive an access request from the UE, wherein the code for causing the at least one computer to generate the disparate portion of the TEID generates the disparate portion of the TEID based at least in part on the access request.

32. A computer program product, comprising:
a non-transitory computer-readable medium comprising:
code for causing at least one computer to receive a packet from a network node comprising a tunnel endpoint identifier (TEID) that includes at least a portion generated by a donor evolved Node B (eNB);
code for causing the at least one computer to determine a disparate network node to receive the packet based at least in part on the TEID;
code for causing the at least one computer to transmit the packet to the disparate network node;
code for causing the at least one computer to generate the portion of the TEID; and
code for causing the at least one computer to store the portion of the TEID along with an identifier of the disparate network node in a routing table comprising one or more portions of TEIDs and related identifiers of next hop network nodes.

33. The computer program product of claim 32, wherein the identifier is a cell radio network temporary identifier (C-RNTI) of the disparate network node.

34. An apparatus, comprising:
a routing table component that identifies a network node related to a tunnel endpoint identifier (TEID) received in a packet from a disparate network node, wherein the TEID includes a portion generated by a donor evolved Node B (eNB) and a disparate portion, with respect to the portion generated by the donor eNB, generated by a relay eNB, wherein the routing table component further maintains a routing table comprising TEID portions associated with identifiers of related network nodes, locates the portion generated by the donor eNB in the routing table, and identifies the network node based on an identifier associated with the portion generated by the donor eNB in the routing table; and
a packet routing component that transmits the packet to the network node.

35. The apparatus of claim 34, further comprising a TEID prefix receiving component that obtains the portion generated by the donor eNB from an upstream node, wherein the routing table component stores the portion generated by the donor eNB in the routing table along with the identifier of the network node.

36. The apparatus of claim 34, wherein the routing table component stores the disparate portion of the TEID along with an identifier of the network node.

37. The apparatus of claim 36, wherein the routing table component locates the disparate portion of the TEID, along with an association to the identifier of the network node, in another routing table.

38. The apparatus of claim 36, wherein the network node is a user equipment (UE), and the routing table component stores the disparate portion of the TEID with a radio bearer identifier related to the UE.

39. An apparatus, comprising:
a routing table component that identifies a network node related to a tunnel endpoint identifier (TEID) received in a packet from a disparate network node, wherein the TEID includes a portion generated by a donor evolved Node B (eNB);
a packet routing component that transmits the packet to the network node; and
a TEID prefix generating component that creates a disparate portion of the TEID, wherein the routing table component stores the disparate portion of the TEID along with an identifier of the network node, wherein the network node is a user equipment (UE), and the routing table component stores the disparate portion of the TEID with a radio bearer identifier related to the UE, wherein the TEID prefix generating component creates the disparate portion of the TEID based at least in part on receiving an access request from the UE.

40. The apparatus of claim 39, further comprising a TEID requesting component that requests the portion generated by the donor eNB from the donor eNB.

41. An apparatus, comprising:
a routing table component that identifies a network node related to a tunnel endpoint identifier (TEID) received in a packet from a disparate network node, wherein the TEID includes a portion generated by a donor evolved Node B (eNB);
a packet routing component that transmits the packet to the network node; and
a TEID prefix generating component that creates the portion of the TEID, wherein the routing table component stores the portion of the TEID with an identifier of the network node in a routing table comprising one or more portions of TEIDs and related identifiers of next hop network nodes.

42. The apparatus of claim 41, wherein the identifier is a cell radio network temporary identifier (C-RNTI) of the network node.

* * * * *